(12) United States Patent
Overley et al.

(10) Patent No.: US 11,731,842 B2
(45) Date of Patent: Aug. 22, 2023

(54) BYPASS CARTON ACCUMULATOR

(71) Applicant: The Procter & Gamble Company, Cincinnati, OH (US)

(72) Inventors: Matthew Bernard Overley, Cincinnati, OH (US); Pawel Marek Siczek, Liberty Township, OH (US); André Mellin, Amberley Village, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1 day.

(21) Appl. No.: 17/473,061

(22) Filed: Sep. 13, 2021

(65) Prior Publication Data
US 2023/0081702 A1     Mar. 16, 2023

(51) Int. Cl.
*B65G 47/29* (2006.01)
*B65G 47/26* (2006.01)
*B65G 47/08* (2006.01)
*B65G 47/88* (2006.01)
*B65G 47/91* (2006.01)

(52) U.S. Cl.
CPC ......... *B65G 47/261* (2013.01); *B65G 47/086* (2013.01); *B65G 47/29* (2013.01); *B65G 47/8823* (2013.01); *B65G 47/912* (2013.01); *B65G 2201/0235* (2013.01)

(58) Field of Classification Search
CPC ...... B65G 47/29; B65G 47/086; B65G 47/88; B65G 47/8823; B65G 47/912; B65G 2201/0235

USPC ....... 198/459.6; 53/447; 414/795.2
See application file for complete search history.

(56) References Cited

U.S. PATENT DOCUMENTS

| | | | | |
|---|---|---|---|---|
| 4,932,190 | A * | 6/1990 | Bergner | B65G 47/082 53/73 |
| 5,038,549 | A * | 8/1991 | Nordstrom | B65B 35/50 414/794.9 |
| 5,634,548 | A * | 6/1997 | Leeds | B65G 47/086 414/931 |
| 7,643,901 | B2 * | 1/2010 | Ponti | B65G 57/24 700/217 |
| 8,657,555 | B2 * | 2/2014 | Kokubo | B65H 31/3054 271/223 |
| 9,862,552 | B2 * | 1/2018 | Beer | B65G 47/841 |
| 10,899,562 | B2 * | 1/2021 | Overley | B65G 57/186 |
| 11,001,453 | B2 * | 5/2021 | Hironaka | B65G 15/30 |

* cited by examiner

*Primary Examiner* — Douglas A Hess
(74) *Attorney, Agent, or Firm* — Richard L. Alexander

(57) ABSTRACT

A system is provided comprising a carton conveyor and a bypass carton accumulator adjacent to, and interfaced with, the carton conveyor. The bypass carton accumulator may comprise: a carton pick apparatus comprising a carton pick head; at least one stop device comprising a stopper movable between a first and a second position; and a storage apparatus. When in the first position, the stopper does not interfere with the flow of cartons along the conveyor and when in the second position, the stopper engages with a carton to stop a flow of cartons along the conveyor. The carton pick apparatus may be configured to pick up via the carton pick head a set of cartons from a pick-up zone of the carton conveyor after the stopper has moved to its second position and place the set of cartons in the storage apparatus.

17 Claims, 17 Drawing Sheets

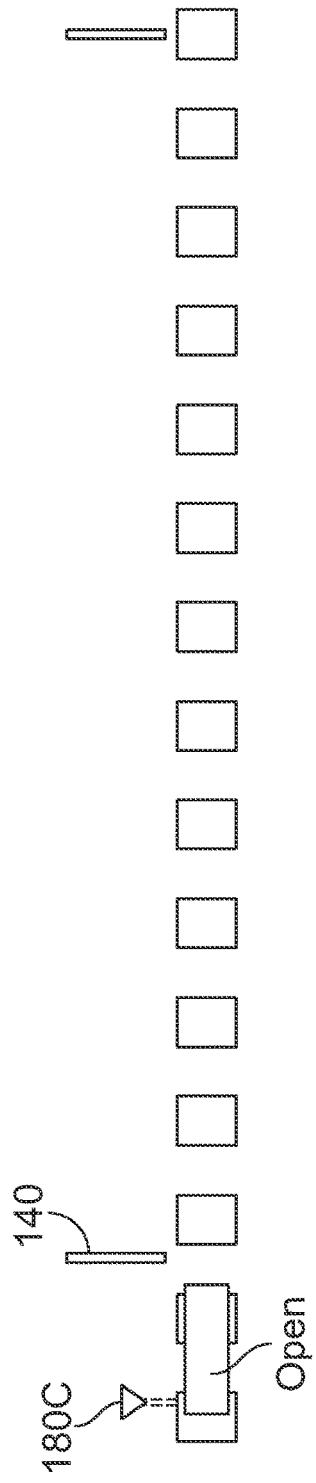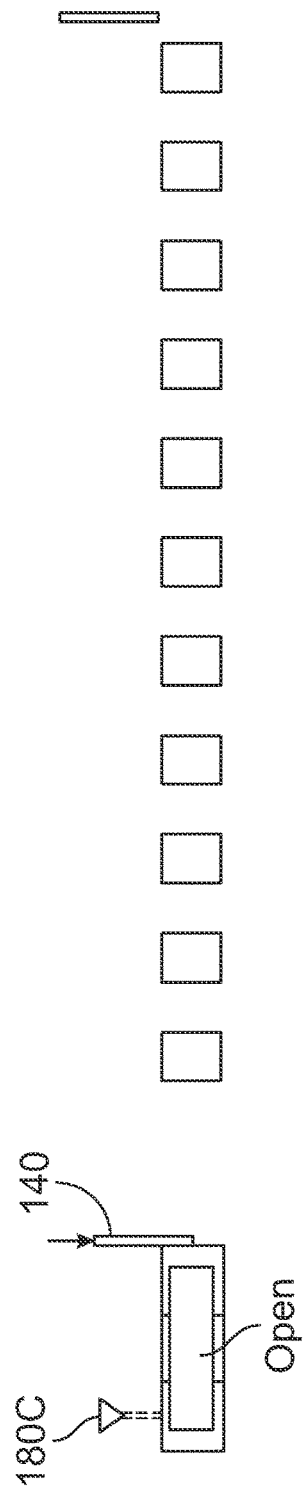

BYPASS CARTON ACCUMULATOR

The present invention relates to a system comprising a carton conveyor and a bypass carton accumulator interfaced with the conveyor.

BACKGROUND OF THE INVENTION

In a product manufacturing line, a number of serially positioned operations may be performed to manufacture and package a product for sale to a consumer. If an upstream operation stops or slows, a subsequent downstream operation will either have to stop or reduce the rate at which it receives output from the upstream operation, resulting in lower product manufacturing efficiency. If a downstream operation stops or slows, then an upstream operation will have to either stop or slow down its rate of output, which also results in a decrease in product manufacturing efficiency. Use of an accumulation device with a manufacturing line is known to substantially improve overall system efficiency by buffering out stops between upstream and downstream operations of the manufacturing line.

SUMMARY OF THE INVENTION

A system is provided comprising a product conveyor and a bypass product accumulator that interfaces with the product conveyor such that the bypass accumulator removes product from the conveyor and stores product in a storage apparatus in a high-density manner, i.e., a matrix of product is assembled in the storage apparatus so that layers of cartons are stacked on top of and in contact with one another and each layer has two or more rows of cartons positioned adjacent to one another such that at least one carton in one row is in direct physical contact with at least one carton in an adjacent row. Further, the accumulator, when not in use, does not interfere with the normal flow of products moving on the product conveyor, i.e., the products do not significantly engage with the accumulator when the accumulator is not in use.

In accordance with one aspect, a system is provided comprising a product conveyor and a bypass product accumulator adjacent to, and interfaced with, the product conveyor. The bypass product accumulator may comprise: a product transfer apparatus; at least one stop device comprising a stopper movable between a first and a second position, when in the first position the stopper does not interfere with the flow of products along the conveyor and when in the second position, the stopper engages with a product to stop a flow of products along the conveyor; and a storage apparatus. The product transfer apparatus may be configured to pick up a set of products from a pick-up zone of the product conveyor after the stopper has moved to its second position and place the set of products in the storage apparatus.

The product conveyor may comprise a product flow direction and wherein the at least one stop device may comprise a first stop device comprising a first stopper. The first stop device may be positioned in a downstream region of the product conveyor and configured such that actuation of the first stop device causes the first stopper to move into a path of the flow of products to stop the flow of products at a first downstream product stop position thereby causing a contiguous backlog of products in the pick-up zone.

The bypass product accumulator may further comprise a clamping device comprising at least one clamping element. The clamping device may be positioned upstream from the first stop device and configured such that actuation of the clamping device causes the at least one clamping element to stop the flow of products at an upstream product stop position thereby preventing the flow of products into the pick-up zone.

The bypass product accumulator may further comprise a second stop device comprising a second stopper. The second stop device may be positioned adjacent to and downstream from the clamping device and upstream of the first stop device. The second stop device may be configured such that actuation of the second stop device causes the second stopper to move adjacent to or engage a product clamped by the clamping device.

The system may further comprise an articulation device coupled to the first stop device and configured to effect movement of the first stopper in a direction away from the clamping device so as to create a gap between the clamping device and a last product to enter the pick-up zone before actuation of the clamping device, thereby adjusting a location of the set of products in the pick-up zone between at least an upstream slug position of the pick-up zone and a downstream slug position of the pick-up zone, wherein the set of products defines a slug of products and a trailing edge of the slug of products is nearer to the clamping device when the slug of products is in the upstream slug position than when the set of products is in the downstream slug position.

The storage apparatus may comprise: a base; a first side containment plate positioned at an upstream end of the storage apparatus and a second side containment plate positioned at a downstream end of the storage apparatus; and a front containment plate positioned at an end of the storage apparatus most proximate to the product conveyor and a back containment plate positioned at an end of the storage apparatus opposite the front containment plate. The product transfer apparatus may be further configured to place a set of products picked up from the upstream slug position of the pick-up zone in an upstream slug position of the storage apparatus and to place a set of products picked up from the downstream slug position of the pick-up zone in a downstream slug position of the storage apparatus. A set of products placed in the upstream slug position of the storage apparatus may abut the first side containment plate. A set of products placed in the downstream slug position of the storage apparatus may abut the second side containment plate.

The product transfer apparatus may be further configured to: (i) sequentially pick up a multiplicity of slugs of products from the pick-up zone, and (ii) sequentially place each slug of products from the multiplicity into the storage apparatus, wherein the slugs of products alternate between the upstream and downstream slug positions of the storage apparatus.

The storage apparatus may further comprise a lift apparatus coupled to the base which allows the height of the base and any products thereon to be adjusted.

The system may further comprise a processor and memory for storing code executable by the processor, the processor when executing the executable code may: (i) actuate the first stop device to, via the first stopper, prevent the flow of products at the first downstream stop position, (ii) actuate the clamping device after actuation of the first stop device to, via the at least one clamping element, stop the flow of products at the upstream product stop position, (iii) actuate the articulation device after actuation of the clamping device to move the first stopper in a direction away from the clamping device to create the gap between the clamping device and the last product to enter the pick-up zone before actuation of the clamping device, and (iv) actuate the product transfer apparatus to pick up an accumulated set of products from the pick-up zone and place the accumulated set of products in the storage apparatus.

The system may further comprise a processor and memory for storing code executable by the processor, the processor when executing the executable code may: (i) actuate the second stop device to cause the second stopper to prevent the flow of products from near the upstream product stop position into the pick-up zone, (ii) allow any products in the pick-up zone to exit along the product conveyor, and (iii) actuate the product transfer apparatus to pick up an accumulated set of products from the storage apparatus and place the accumulated set of products in the pick-up zone of the product conveyor.

The product transfer apparatus may comprise a product pick head comprising one or more vacuum suction cups.

In accordance with a second aspect, a method is provided for moving products from a product conveyor to a storage apparatus using a bypass product accumulator positioned adjacent to, and interfaced with, the product conveyor. The bypass product accumulator may comprise: a product transfer apparatus; a first stop device comprising a first stopper, the first stop device positioned in a downstream region of the product conveyor; and a clamping device comprising at least one clamping element, the clamping device positioned upstream from the first stop device. The method may comprise: actuating the first stop device to, via the first stopper, prevent the flow of products at a first downstream stop position; actuating the clamping device after actuation of the first stop device to, via the at least one clamping element, stop the flow of products at an upstream product stop position; and actuating the product transfer apparatus to pick up an accumulated set of products from a pick-up zone of the product conveyor and place the accumulated set of products in the storage apparatus.

The bypass product accumulator may further comprise an articulation device coupled to the first stopper. The method may further comprise: actuating the articulation device after actuation of the clamping device to effect movement of the first stopper to create a gap between the clamping device and a last product to enter the pick-up zone of the conveyor before actuation of the clamping device.

The articulation device may effect movement of the first stop device to create a first gap between the clamping device and a last product to enter the pick-up zone of the conveyor before actuation of the clamping device for a first set of products and may effect movement of the first stop device to create a second gap between the clamping device and a last product to enter the pick-up zone of the conveyor before actuation of the clamping device for a second set of products, wherein the first gap is different from the second gap.

The product transfer apparatus may place the accumulated set of products in an upstream slug position in the storage apparatus. After placing the accumulated set of products in the upstream slug position the method may further comprise: actuating the first stop device to, via the first stopper, prevent the flow of products at the first downstream stop position; actuating the clamping device after actuation of the first stop device to, via the at least one clamping element, stop the flow of products at the upstream product stop position; and actuating the product transfer apparatus to pick up a next accumulated set of products from the pick-up zone of the product conveyor and place the next accumulated set of products in a downstream slug position of the storage apparatus.

In accordance with a third aspect, a method is provided for moving products between a product conveyor and a storage apparatus using a product transfer apparatus. The method may comprise: actuating the product transfer apparatus to sequentially pick up a plurality of slugs of products from the product conveyor and transfer each of the plurality of slugs of products picked from the product conveyor to the storage apparatus so as to build a matrix of products in the storage apparatus. The matrix of products may comprise: first and second layers of slugs of products, the first layer may be positioned over and in contact with the second layer, the first layer may comprise first and second slugs of products positioned side-by-side and adjacent to one another and the second layer may comprise third and fourth slugs of products positioned side-by-side and adjacent to one another.

Preferably, no mechanical separators are positioned between the first and second slugs of products positioned side-by-side, the third and fourth slugs of products positioned side-by-side or the first and second layers of slugs of products.

At least one product of the first slug of products and at least one product of the second slug of products may be in physical contact with one another.

The storage apparatus may comprise a containment device defined by a containment box having inner dimensions and a base having an inner surface, wherein the containment device may define a volume for receiving slugs of products defined by the inner dimensions of the containment box and extending from the inner surface of the base to an upper surface of the containment box, wherein slugs of product are capable of filling at least 75% of the volume.

The method may further comprise actuating the product transfer apparatus to pick up a slug of products from the storage apparatus and place the slug of products on the product conveyor.

BRIEF DESCRIPTION OF THE DRAWINGS

FIGS. 19A-19C illustrate a process for clearing the carton conveyor to receive a slug of cartons.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

The following term explanations may be useful in understanding the present disclosure:

The term "carton flow direction" (CFD) is used herein to refer to the direction of carton flow through a process, i.e., along a carton conveyor.

The term "upstream region" is used herein to refer to a region near a beginning point of the carton conveyor.

The term "downstream region" is used herein to refer to a region near an end point of the carton conveyor.

Figure 1:
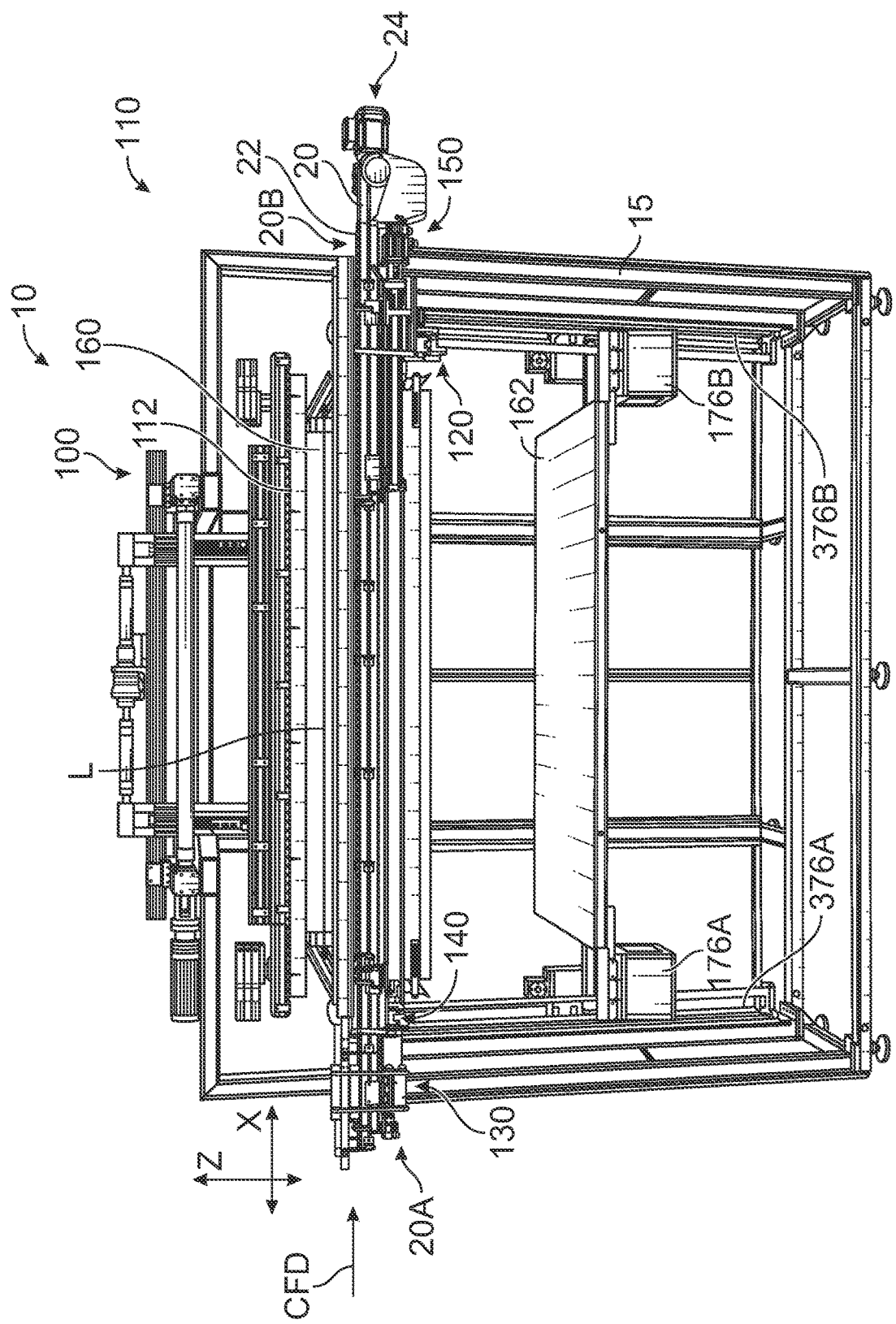
FIG. 1 is a side view of a system comprising a carton conveyor and a bypass carton accumulator.
Figure 2:
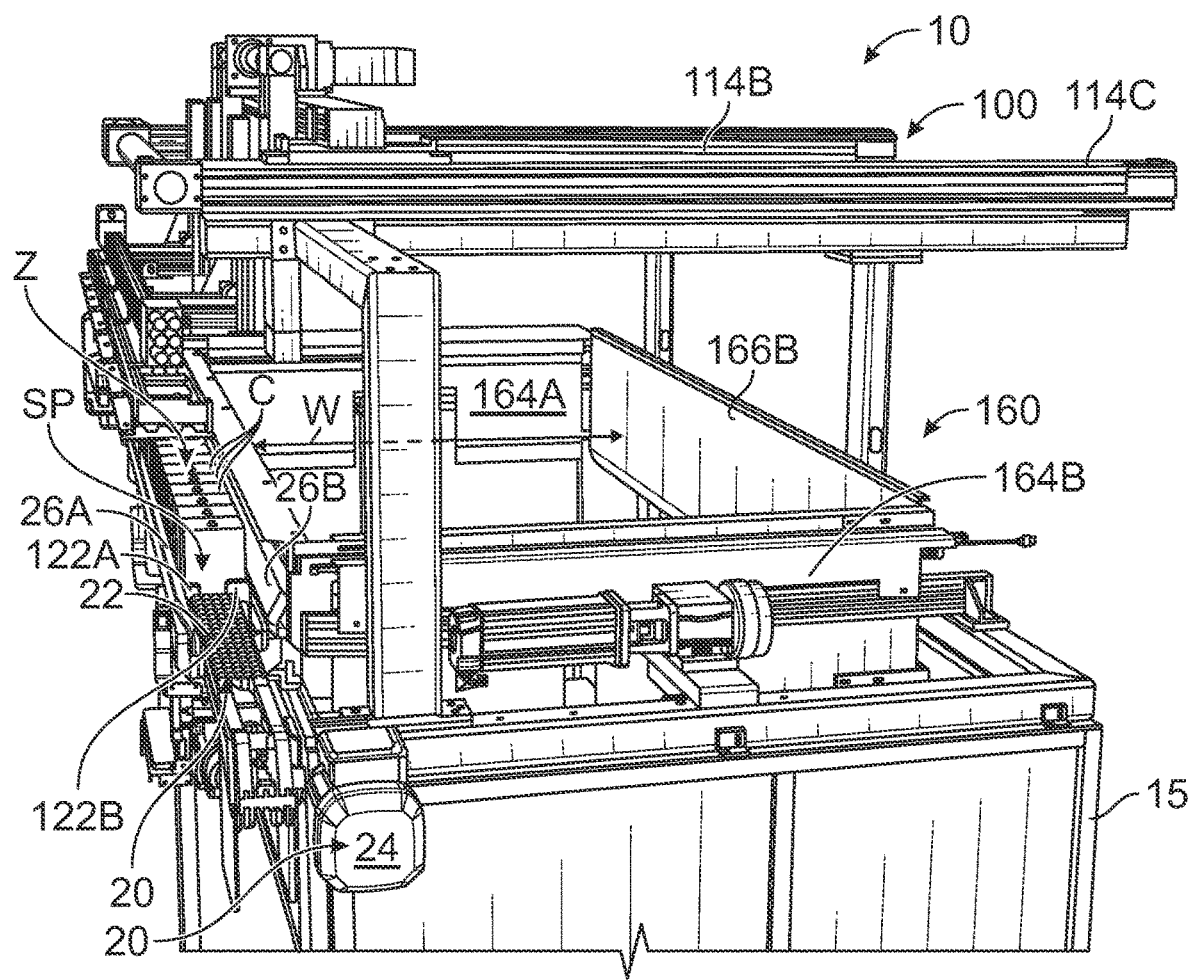
FIGS. 2 and 3 are perspective views of the system of FIG. 1.
Figure 3:
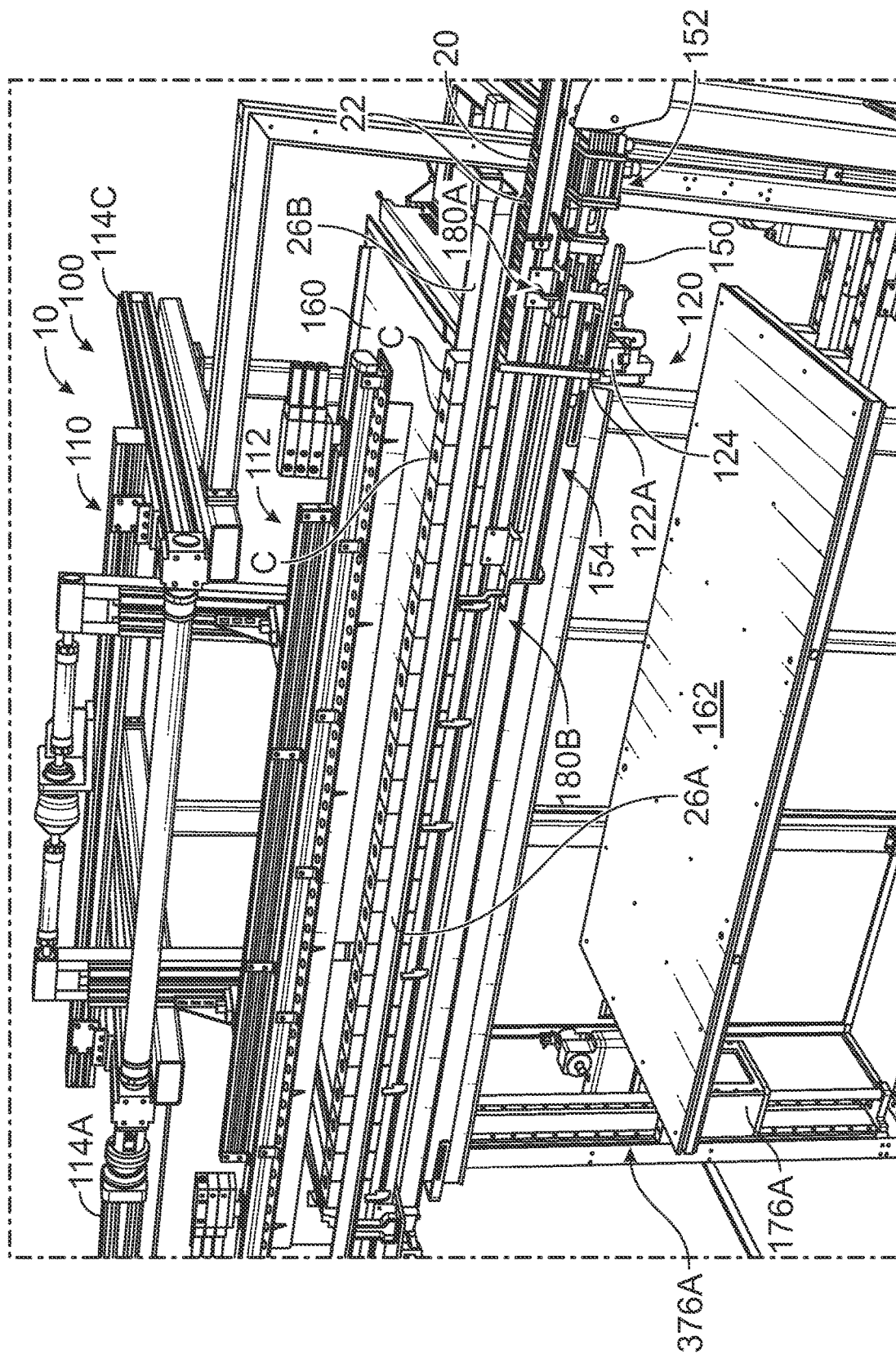
Figure 4:
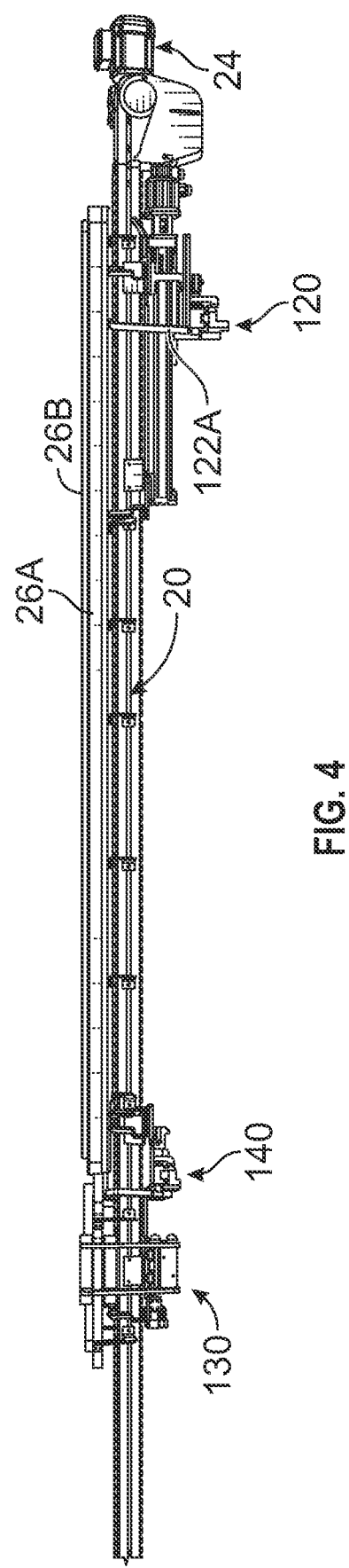
FIG. 4 is a side view of a carton conveyor of the system of FIG. 1.

In accordance with the present disclosure, a system is provided comprising a product or carton conveyor and a bypass product or carton accumulator positioned adjacent to, and interfaced with, the carton conveyor. In the embodiment described herein, the product comprises a carton, such as a tissue carton. However, the "product" may comprise other containers or boxes housing the same or other articles or may comprise any other article or product not in a container that may move along a conveyor. FIGS. 1-3 illustrate a system 10 comprising a main frame 15, a carton conveyor 20 coupled to the frame 15 and a bypass carton accumulator 100 coupled to the frame 15 and positioned adjacent to, and interfaced with, the carton conveyor 20. The carton conveyor 20 comprises an endless conveyor belt 22 driven by a conveyor drive motor 24, which conveyor drive motor 24 is controlled by a main electronic controller 30, see FIGS. 4 and 5. In the illustrated embodiment, the controller 30 operates the conveyor drive motor 24 continuously while the system is operational, i.e., ON. Positioned on opposite sides of the conveyor belt 22 are first and second carton conveyor rails or guides 26A and 26B. The conveyor belt 22 rotates in a clockwise direction as viewed in FIG. 1 so as to move cartons C, see FIGS. 2 and 3, in a carton flow direction indicated by arrow CFD from an upstream region 20A of the carton conveyor 20 to a downstream region 20B of the carton conveyor 20, see FIG. 1. The cartons C may be delivered to the upstream region 20A via a cartoner and the conveyor belt 22 may deliver the cartons C from the downstream region 20B to a wrapper or casepacker.

Figure 5:
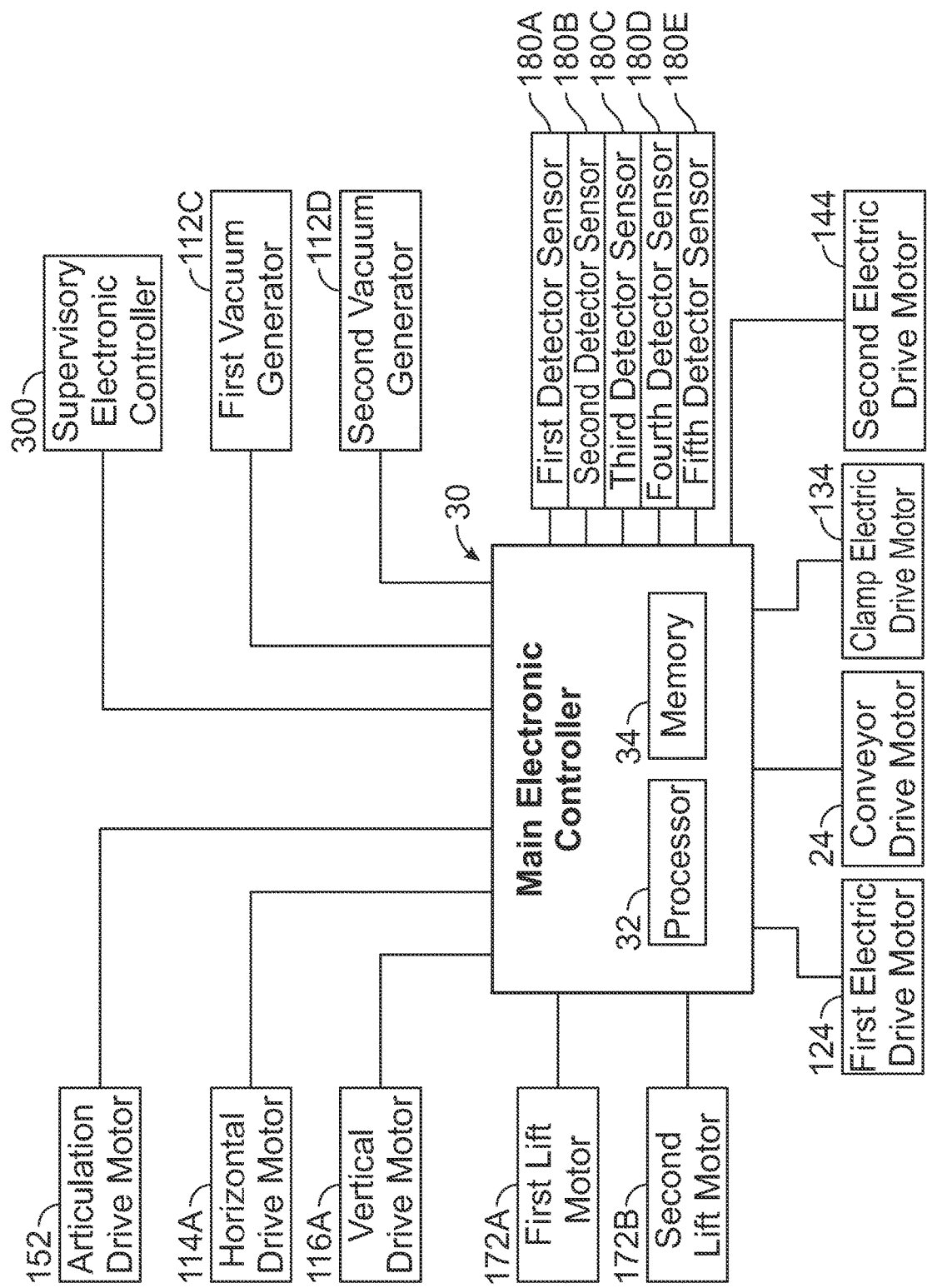
FIG. 5 is a block diagram of a main electronic controller of the system of FIG. 1 and elements coupled to the controller.

The electronic controller 30 comprises a processor 32 and a memory component 34 for storing code executable by the processor 32, see FIG. 5. The processor 32 may comprise any processing component operable to receive and execute instructions (such as from the memory component 34). The processor 32 may comprise any kind of a device which receives input data, processes that data through computer instructions, and generates output data. Such a processor can be a programmable logic controller (PLC), microcontroller, laptop or notebook computer, desktop computer, microcomputer, digital signal processor (DSP), mainframe, server, other programmable computer devices, or any combination thereof. Such a processor can also be implemented using programmable logic devices such as field programmable gate arrays (FPGAs) or, alternatively, realized as application specific integrated circuits (ASICs) or similar devices. The term "processor" or "controller" is also intended to encompass a combination of two or more of the above recited devices, e.g., two or more microcontrollers.

The memory component 34 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Additionally, the memory component 34 may store software, code, instructions or applications that can be executed by the processor 32.

The bypass carton accumulator 100 may comprise: a product transfer apparatus, which, in the illustrated embodiment, comprises a product/carton pick apparatus 110 comprising a product/carton pick head 112; a first stop device 120 positioned in the downstream region 20B of the carton conveyor 20; a clamping device 130 positioned upstream of the first stop device 120; a second stop device 140 positioned adjacent to and downstream from the clamping device 130 and upstream of the first stop device 120; an articulation device 150 coupled to the first stop device 120 to effect movement of the first stop device 120; and a storage apparatus 160.

The first stop device 120 may comprise a first stopper 122 comprising first and second stopper arms 122A and 122B, see FIGS. 1-8, which are pivotably supported to a housing block 223 via first and second pivot shafts 122C and 122D. A first electric drive motor 124 may be coupled to a first actuator 126 having opposing first and second drive shafts 126A and 126B, see FIG. 7, wherein the first and second drive shafts 126A and 126b move between inward and outward positions. The drive motor 124 may drive a gear (not shown) that meshes with an internal screw shaft (not shown) within the actuator 126, which screw shaft may have opposing threads on opposite halves driving corresponding nuts (not shown) coupled to the first and second drive shafts 126A and 126B for effecting movement of the first and second drive shafts 126A and 126B. First and second runner blocks 220 and 222, which move along a linear rail 224, are coupled to the first and second drive shafts 126A and 126B and are caused to move toward and away from one another by the first and second drive shafts 126A and 126B. The first runner block 220 may comprise a first shaft 220A that engages with the first stopper arm 122A to cause the first stopper arm 122A to pivot between first and second positions about the first pivot shaft 122C. The second runner block 222 may comprise a second shaft 222A that engages with the second stopper arm 122B to cause the second stopper arm 122B to pivot between first and second positions about the second pivot shaft 122D. Actuation of the first drive motor 124 is caused by the electronic controller 30 to which the drive motor 124 is coupled. Actuation of the drive motor 124 causes movement of the first and second runner blocks 220 and 222, which causes the first and second stopper arms 122A and 122B to pivot between their first position, where the arms 122A and 122B are positioned out of a path of the flow of the cartons C as the cartons C move along the carton conveyor 20, see FIG. 8, and the second position, see FIG. 2, where the arms 122A and 122B are positioned in the path of the cartons C as they move along the carton conveyor 20. When the first and second stopper arms 122A and 122B are located in their first position, the first stopper 122 is located in a first position and when the first and second stopper arms 122A and 122B are located in their second position, the first stopper 122 is located in a second position. When the first and second arms 122A and 122B are positioned in the path of the cartons C, they engage the cartons C so as to stop the flow of cartons C along the carton conveyor 20 at a first downstream product/carton stop position SP, as illustrated in FIG. 2, thereby causing a contiguous backlog of cartons C in a pick-up zone Z. The pick-up zone Z may generally extend between the first stop device 120 and the clamping device 140 and may also be defined as extending between the first and second stop devices 120 and 130. It is noted that the conveyor belt 22 may continue to move when the cartons C are stopped by the first and second arms 122A and 122B. When the first and second arms 122A and 122B are positioned out of the path of the cartons C, the arms 122A and 122B are disengaged from the cartons C so as to allow the free flow of cartons C along the carton conveyor 20.

Figure 9:
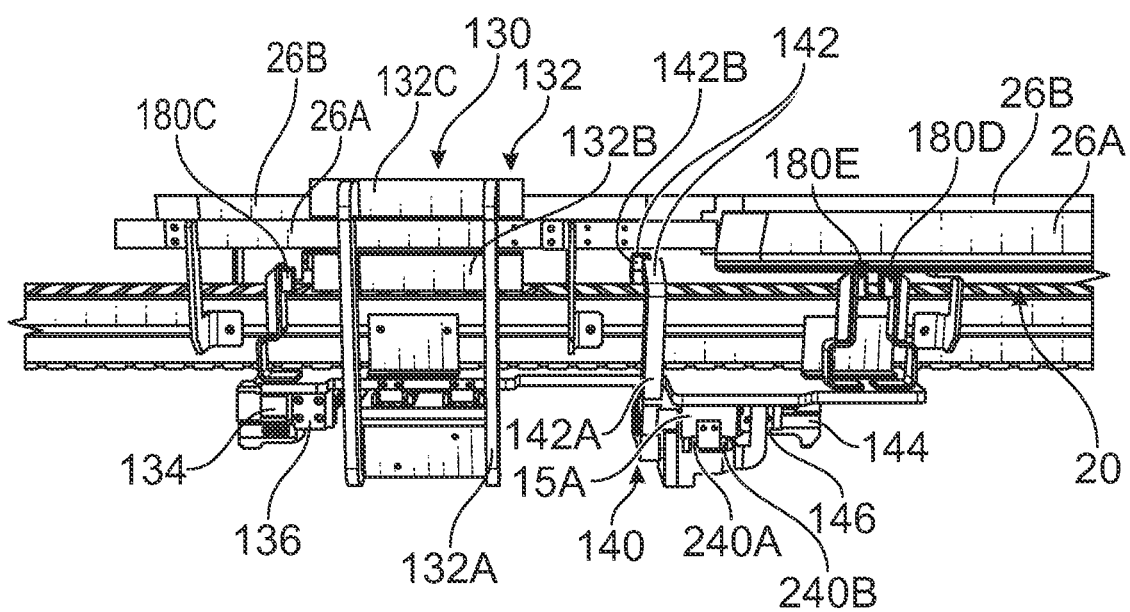
FIG. 9 is a side view of a portion of the system of FIG. 1 illustrating a clamping device and a second stop device.
Figure 10:
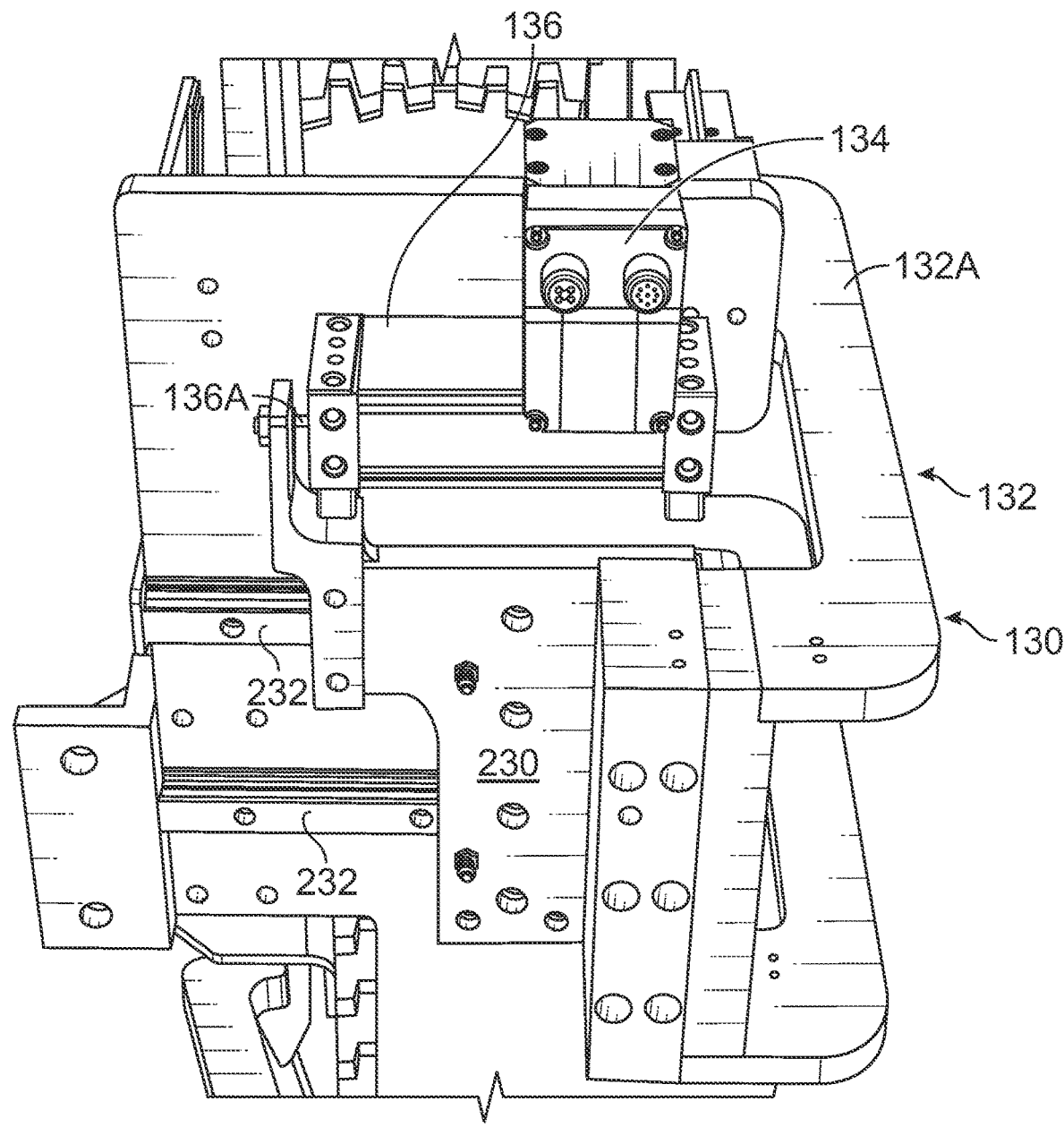
FIG. 10 is a perspective view of the clamping device.

The clamping device 130 comprises a clamp assembly 132 comprising a movable frame 132A and first and second clamp members 132B and 132C fixed to the frame 132A for movement with the frame 132A, see FIG. 9. A clamp electric drive motor 134 may be coupled to a clamp actuator 136 having a drive shaft 136A, wherein the drive shaft 136A moves between inward and outward positions, see FIGS. 9 and 10. The drive motor 134 may drive a gear (not shown) that meshes with an internal screw shaft (not shown) within the actuator 136, which screw shaft may have a corresponding nut (not shown) coupled to the drive shaft 136A for effecting movement of the drive shaft 136A. A clamp block 230 may be coupled to first and second runner blocks (not visible in FIG. 10). The runner blocks may move along linear rails 232. The clamp block 230 may be fixedly coupled to the drive shaft 136A and is caused to move inwardly and outwardly by the drive shaft 136A. The clamp block 230 may be fixed to the clamp assembly frame 132A to cause the clamp assembly 132 to move toward and away from the second carton conveyor rail 26B. Actuation of the clamp drive motor 134 is caused by the electronic controller 30 to which the drive motor 134 is coupled. Actuation of the drive motor 134 causes movement of the clamp block 230, which causes the clamp assembly 132 to move between (i) a first position, where the first and second clamp members 132B and 132C move toward the second carton conveyor rail 26B to clamp one or more cartons C between the clamp members 132B and 132C and the second carton conveyor rail 26B and (ii) a second position, where the first and second clamp members 132B and 132C move away from the second carton conveyor rail 26B so as to allow cartons C to pass between the clamp members 132B and 132C and the second carton conveyor rail 26B. When the first and second clamp members 132B and 132C are moved toward the second carton conveyor rail 26B, the first and second clamp members 132B and 132C and the second carton conveyor rail 26B stop the flow of cartons at an upstream product/carton stop position thereby preventing the flow of cartons into the pick-up zone Z.

The second stop device 140 may comprise a second stopper 142 comprising third and fourth stopper arms 142A and 142B, see FIG. 9, which are pivotably supported via third and fourth pivot shafts to a fixed housing block 15A coupled to the frame 15. A second electric drive motor 144 may be coupled to a second actuator 146 having opposing third and fourth drive shafts (not shown), wherein the third and fourth drive shafts move between inward and outward positions. The drive motor 144 may drive a gear (not shown) that meshes with an internal screw shaft (not shown) within the actuator 146, which screw shaft may have opposing threads on opposite halves driving corresponding nuts (not shown) coupled to the third and fourth drive shafts for effecting movement of the third and fourth drive shafts. Third and fourth runner blocks 240A and 240B, which move along a linear rail, are coupled to the third and fourth drive shafts and are caused to move toward and away from one another by the third and fourth drive shafts. The third runner block 240A may comprise a third shaft that engages with the third stopper arm 142A to cause the third stopper arm 142A to pivot between first and second positions. The fourth runner block 240B may comprise a fourth shaft that engages with the fourth stopper arm 142B to cause the fourth stopper arm 142B to pivot between first and second positions. Actuation of the second drive motor 144 is caused by the electronic controller 30 to which the drive motor 144 is coupled. Actuation of the drive motor 144 causes movement of the third and fourth runner blocks 240A and 240B, which causes the third and fourth stopper arms 142A and 142B to pivot between their first position, where the arms 142A and 142B are positioned out of the path of the flow of the cartons C as the cartons C move along the carton conveyor 20, and the second position, where the arms 142A and 142B are positioned in the path of the cartons C as they move along the carton conveyor 20.

As noted above, the articulation device 150 is coupled to the first stop device 120 to effect movement of the first stop device 120. The articulation device 150 may comprise an articulation drive servo-motor 152, which may be coupled to a linear actuator 154 having a linearly moveable cleat (not shown) fixedly coupled to the first stop device 120 for linearly moving the first stop device 120 back and forth along an X axis generally parallel to the carton flow direction CFD, see FIG. 1. The linear actuator 154 may comprise first and second internal pulleys (not shown) and one or more internal belts extending between the pulleys. The cleat may be fixed to the one or more belts and extends outside of a housing of the linear actuator 154. Actuation of the articulation drive servo-motor 152 is caused by the electronic controller 30 to which the drive servo-motor 152 is coupled. Actuation of the drive servo-motor 152 may cause the drive servo-motor 152 to drive one of the pulleys to effect rotation of the one or more belts to effect linear movement of the cleat and, hence, the first stop device 120. For example, actuation of the drive servo-motor 152 may effect movement of the first stop device 120, and hence, the first stopper 122, in a direction away from the clamping device 130 and the second stop device 140 so as to create a gap between the clamping device 130 and a last carton C to enter the pick-up zone Z before actuation of the clamping device 130.

The storage apparatus 160 may comprise a movable base 162, a first side containment plate or wall 164A positioned at an upstream end of the storage apparatus 160, a second side containment plate or wall 164B positioned at a downstream end of the storage apparatus 160, a front containment plate or wall 166A positioned at an end of the storage apparatus 160 most proximate to the carton conveyor 20 and a back containment plate or wall 166B positioned at an end of the storage apparatus 160 opposite the front containment plate 166A, see FIGS. 1, 2, 11 and 12. The first and second side plates 164A and 164B and the front and back containment plates 166A and 166B are fixed to the frame 15, while the based 162 is vertically movable. As will be discussed further below, the carton pick apparatus 110 is configured to place via the carton pick head 112 a set of cartons or slug of cartons SC picked up from the pick-up zone Z on the base 162 and within the first and second side plates 164A and 164B and the front and back containment plates 166A and 166B of the storage apparatus 160. The first side containment plate 164A, the second side containment plate 164B, the front containment plate 166A and the back containment plate 166B may form a containment box 167.

The storage apparatus 160 further comprises a lift apparatus 170 coupled to the base 162, which allows the height of the base 162 and any cartons C thereon to be vertically adjusted. The lift apparatus 170 comprises first and second lift motors 172A and 172B, which are coupled to and controlled via the electronic controller 30, see FIGS. 5 and 12. The first and second lift motors 172A and 172B are associated with first and second screws 174A and 174B and act to drive, i.e., rotate, the screws 174A and 174B. First and second lift boxes 176A and 176B are fixed to the base 162. The first and second lift boxes 176A and 176B comprise internal threaded nuts (not shown) that engage the first and second screws 174A and 174B, respectively. Actuation of the first and second lift motors 172A and 172B causes the first and second screws 174A and 174B to rotate so as to effect vertical movement of the first and second lift boxes 176A and 176B. The first lift box 176A comprises a plurality of runner boxes 276A that engage with a corresponding slotted lift guide 376A fixed to the frame 15 so as to stabilize the first lift box 176A during movement, see FIGS. 1, 3 and 12. The second lift box 176B comprises a plurality of runner boxes 276B that engage with a corresponding slotted lift guide 376B fixed to the frame 15 so as to stabilize the second lift box 176B during movement, see FIGS. 1 and 12.

Figure 11:
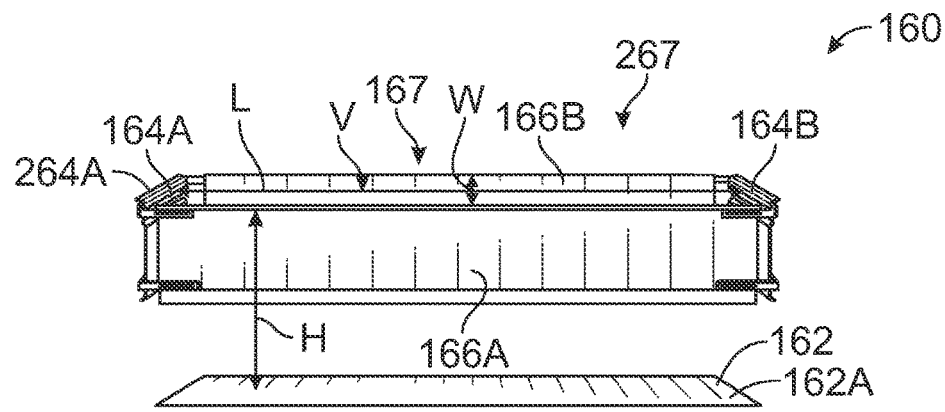
FIG. 11 is a perspective view of a containment box and a movable base of a storage apparatus of the system.
Figure 12:
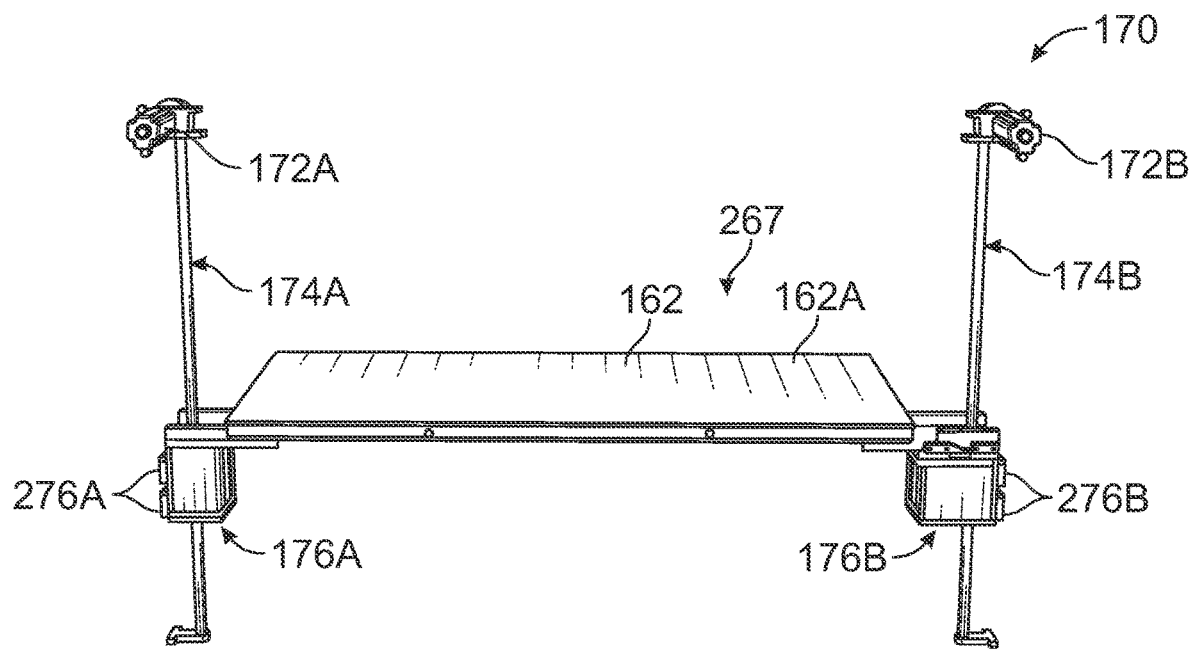
FIG. 12 is a perspective view of the movable base and a lift apparatus coupled to the base.

The first side containment plate 164A, the second side containment plate 164B, the front containment plate 166A, the back containment plate 166B and the movable base 162 may define a containment device 267. The containment device 267 may comprise a variable volume V for receiving cartons C defined by inner dimensions of the containment box 167, i.e., a length L and a width W, see FIGS. 1, 2 and 11, and a variable height H, which extends from an inner surface 162A of the base 162 to upper surfaces of the first side containment plate 164A, the second side containment plate 164B, the front containment plate 166A and the back containment plate 166B. In FIG. 11, the variable height is illustrated as extending from the inner surface 162A of the base 162 to the upper surface 264A of the first side containment plate 164A. The volume V of the containment device 267 varies in the illustrated embodiment due to the base 162 being movable. While the volume V in the FIG. 11 embodiment is rectangular in shape, the volume could be cylindrical.

Figure 13:
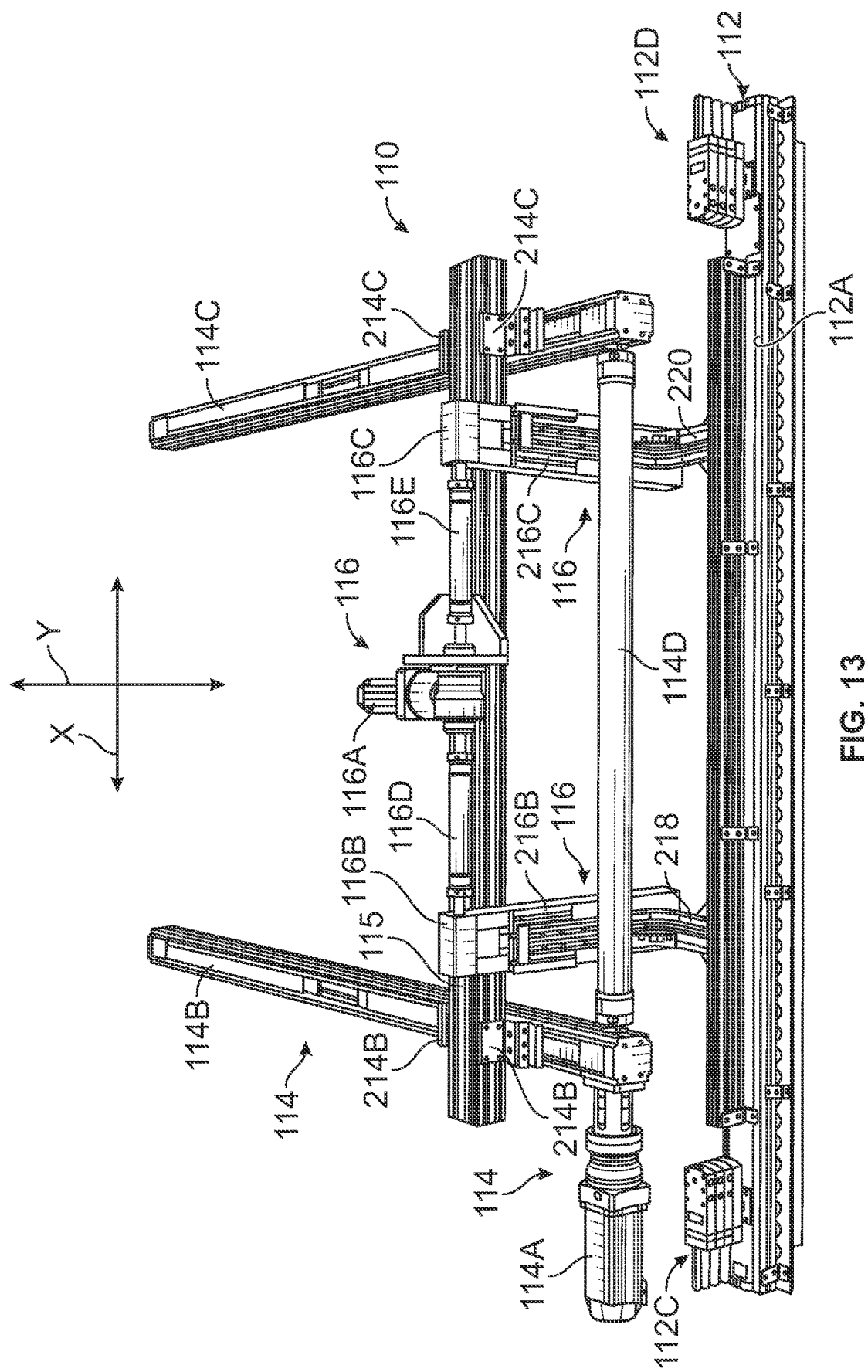
FIGS. 13 and 14 are perspective views of a carton pick apparatus of the system.
Figure 14:
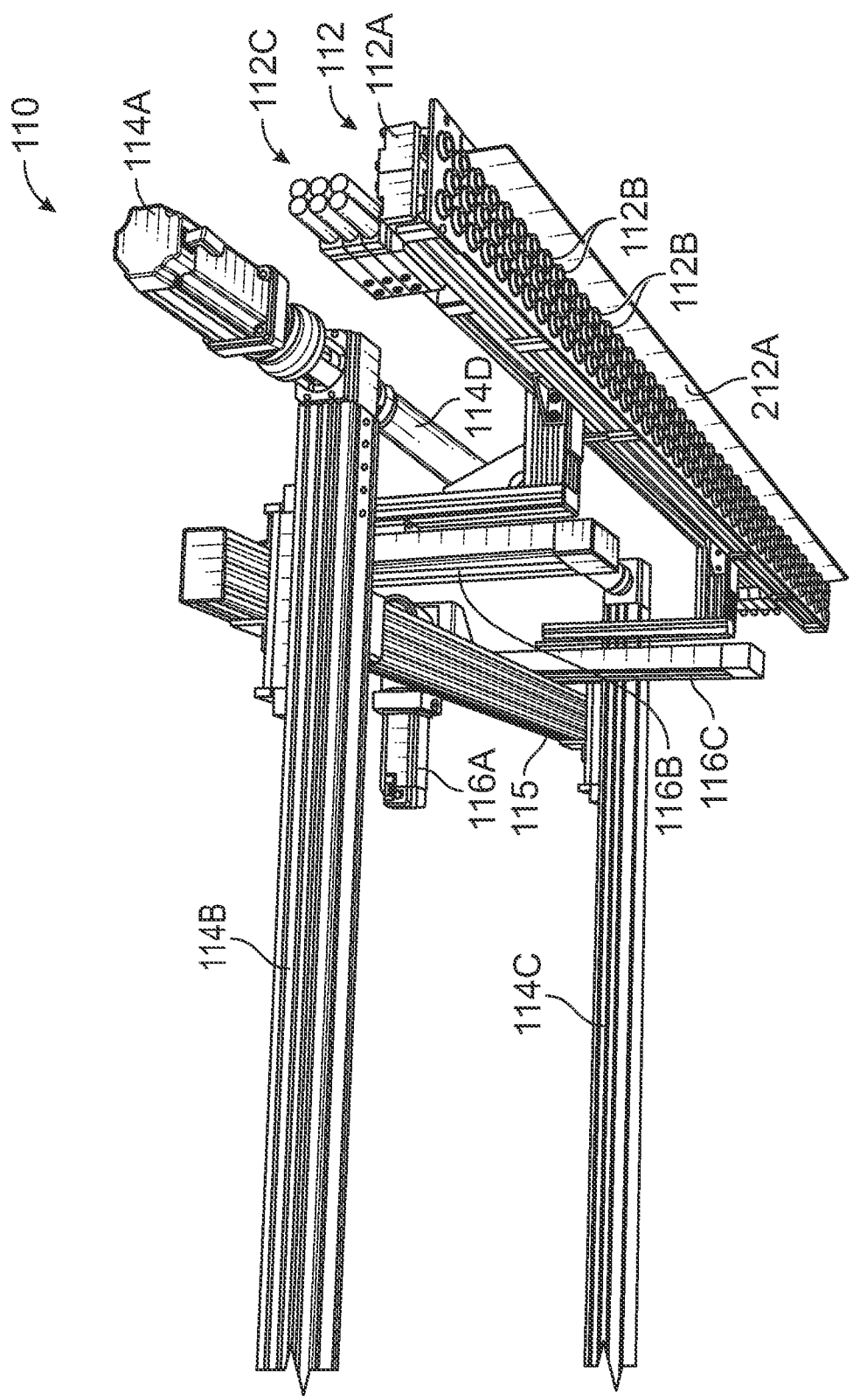

As noted above, the carton pick apparatus 110 comprises a carton pick head 112. The carton pick head 112 comprises a main body 112A, see FIGS. 13 and 14, having an internal manifold (not shown). A plurality of suction cups 112B may be provided along the length of a surface of the main body 112A closest to the carton conveyor 20 and may communicate with the internal manifold, see FIG. 14. First and second conventional vacuum generators 112C and 112D communicate with the manifold in the main body 112A so as to generate a vacuum (relative to atmospheric pressure) in the suction cups 112B to allow the suction cups 112B to grasp a slug SC of cartons on the carton conveyor 20. The first and second vacuum generators 112C and 112D may be coupled to and controlled via the electronic controller 30. It is contemplated that the vacuum generators 112C and 112D may also be capable of generating a positive pressure flow of air (relative to atmospheric pressure) to help separate the cartons C from the suction cups 112B.

The main body 112A may be provided with an alignment plate 212A to align the cartons C of a slug of cartons SC before the slug of cartons SC is moved from the carton conveyor 20 to the storage apparatus 160.

Instead of using a carton pick head 112 comprising a plurality of suction cups, the carton pick head may comprise a mechanical clamp for grasping a slug of cartons SC or a vacuum conveyor.

The carton pick apparatus 110 further comprises horizontal drive apparatus 114 and vertical drive apparatus 116 to move the carton pick head 112 relative to the carton conveyor 20 and the storage apparatus 160.

The horizontal drive apparatus 114 comprises a horizontal drive servo-motor 114A and first and second horizontal linear actuators 114B and 114C. A first drive shaft 114D extends between the first and second horizontal linear actuators 114B and 114C to provide rotary motion from the horizontal drive servo-motor 114A and the first horizontal linear actuator 114B to the second horizontal linear actuator 114C. The first horizontal linear actuator 114B comprises a linearly movable first horizontal cleat 214B that engages with a transverse beam 115. The second horizontal linear actuator 114C comprises a linearly movable second horizontal cleat 214C that also engages with the transverse beam 115. The first and second cleats 214B and 214C are adapted to linearly move the transverse beam 115, to which the carton pick head 112 is coupled, along a horizontal Y axis, which is generally perpendicular to the X axis and the carton flow direction CFD, see FIG. 13. Each of the first and second linear actuators 114B and 114C may comprise first and second internal pulleys (not shown) and one or more internal belts extending between the pulleys. Each of the first and second cleats 214B and 214C may be fixed to a corresponding one or more belts within its corresponding linear actuator 114B or 114C and extend outside of a housing of its corresponding linear actuator 114B and 114C. Actuation of the horizontal drive servo-motor 114A is caused by the electronic controller 30 to which the drive servo-motor 114A is coupled. Actuation of the drive servo-motor 114A may cause the drive servo-motor 114A to drive one of the pulleys in each of the first and second linear actuators 114B and 114C to effect rotation of the one or more belts in the housing of each of the first and second linear actuators 114B and 114C to effect horizontal linear movement of the first and second cleats 214B and 214C along the Y axis and, hence, horizontal linear movement of the transverse beam 115 and the carton pick head 112 along the Y axis.

The vertical drive apparatus 116 comprises a vertical drive servo-motor 116A and first and second vertical linear actuators 116B and 116C. A first drive shaft 116D extends between the vertical drive servo-motor 116A and the first vertical linear actuator 116B and a second drive shaft 116E extends between the vertical drive servo-motor 116A and the second vertical linear actuator 116C. The vertical drive servo-motor 116A provides rotary motion via the first and second drive shafts 116D and 116E to the first and second vertical linear actuators 116B and 116C.

The first vertical linear actuator 116B comprises a linearly movable first vertical cleat 216B that is coupled to a first bracket 218, which bracket 218 is coupled to the carton pick head 112. The second vertical linear actuator 116C comprises a linearly movable second vertical cleat 216C that is coupled to a second bracket 220, which bracket 220 is also coupled to the carton pick head 112. The first and second vertical cleats 216B and 216C are adapted to vertically move the carton pick head 112 along a vertical Z axis, which is generally perpendicular to the X and Y axes, see FIG. 1. Each of the first and second linear actuators 114B and 114C may comprise first and second internal pulleys (not shown) and one or more internal belts extending between the pulleys. Each of the first and second cleats 216B and 216C may be fixed to a corresponding one or more belts within its corresponding linear actuator 116B or 116C and extend outside of a housing of its corresponding linear actuator 116B and 116C. Actuation of the vertical drive servo-motor 116A is caused by the electronic controller 30 to which the drive servo-motor 116A is coupled. Actuation of the drive servo-motor 116A may cause the drive servo-motor 116A to drive one of the pulleys in each of the first and second linear actuators 116B and 116C to effect rotation of the one or more belts in each of the first and second linear actuators 116B and 116C to effect vertical linear movement of the first and second cleats 216B and 216C and, hence, the vertical linear movement of carton pick head 112.

Figure 6:
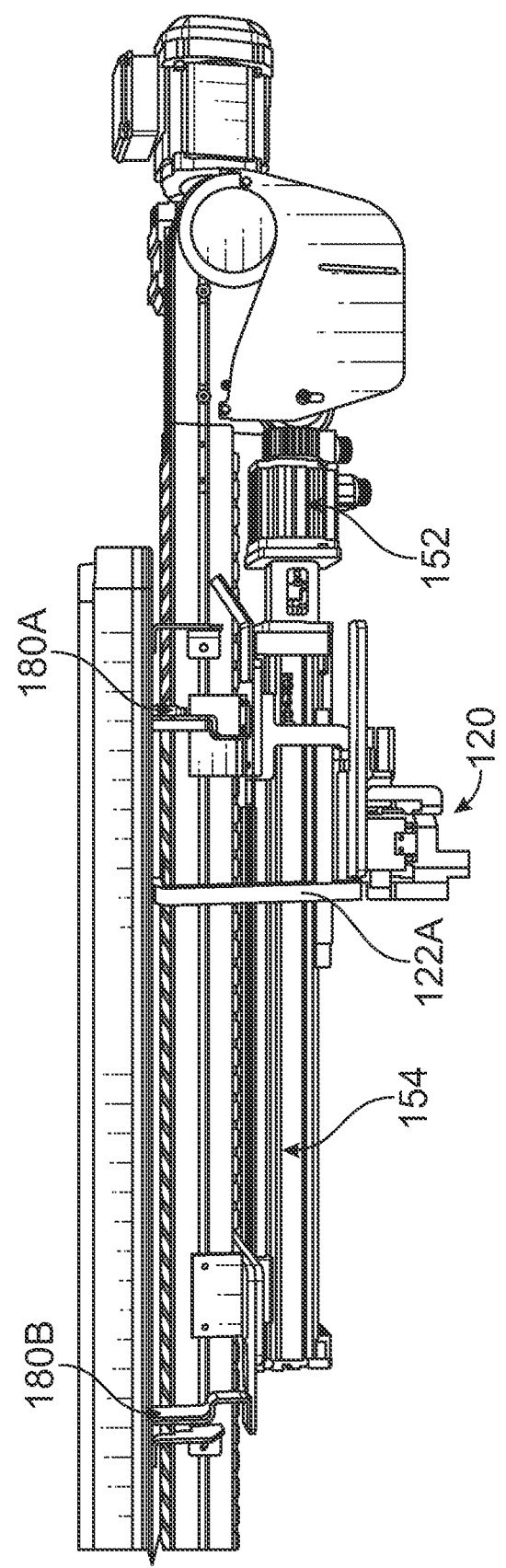
FIG. 6 is a side view of a portion of the system of FIG. 1 illustrating a first stop device and an articulation device coupled to the first stop device.
Figure 7:
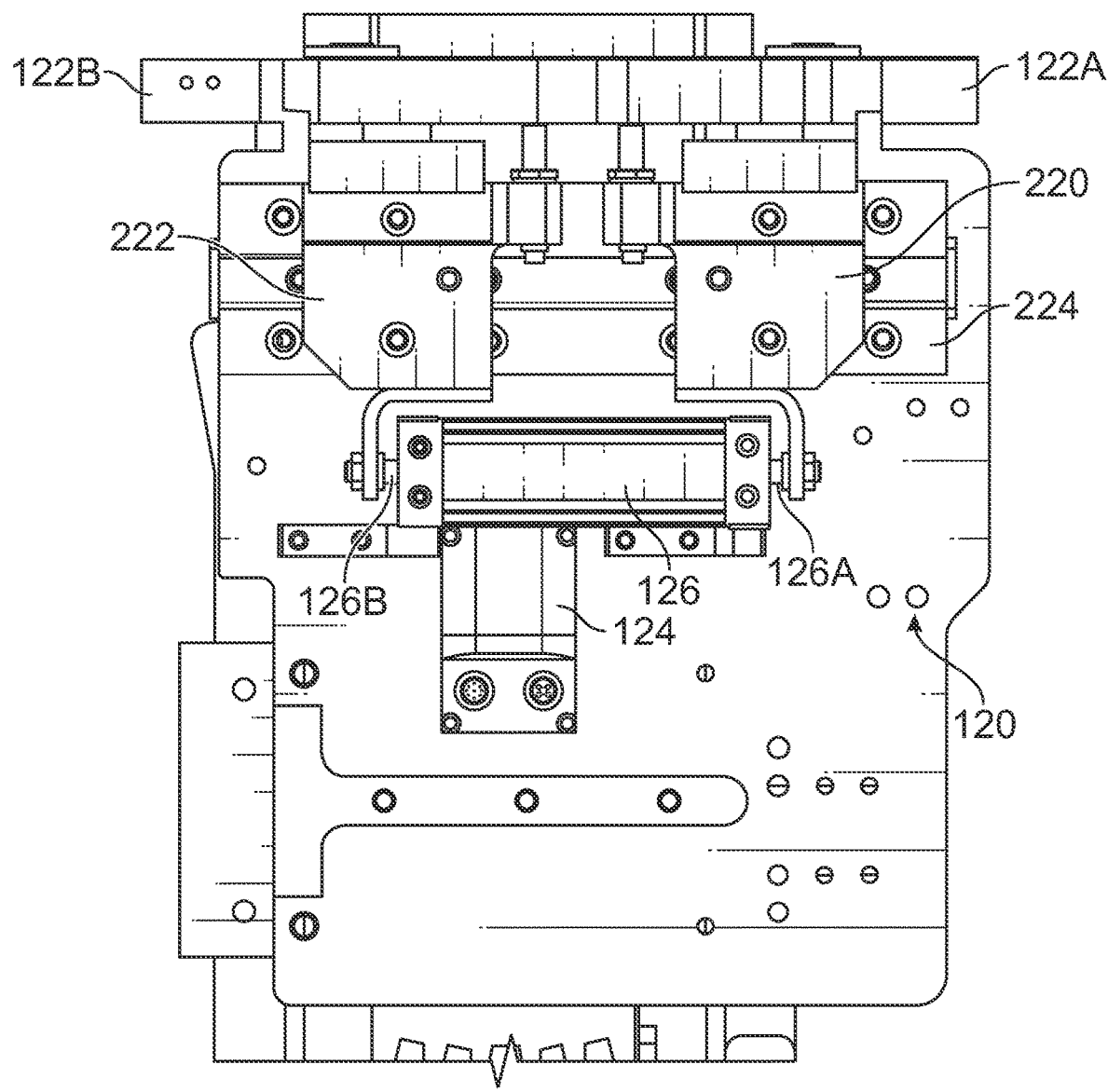
FIG. 7 is a view from below of the first stop device.
Figure 8:
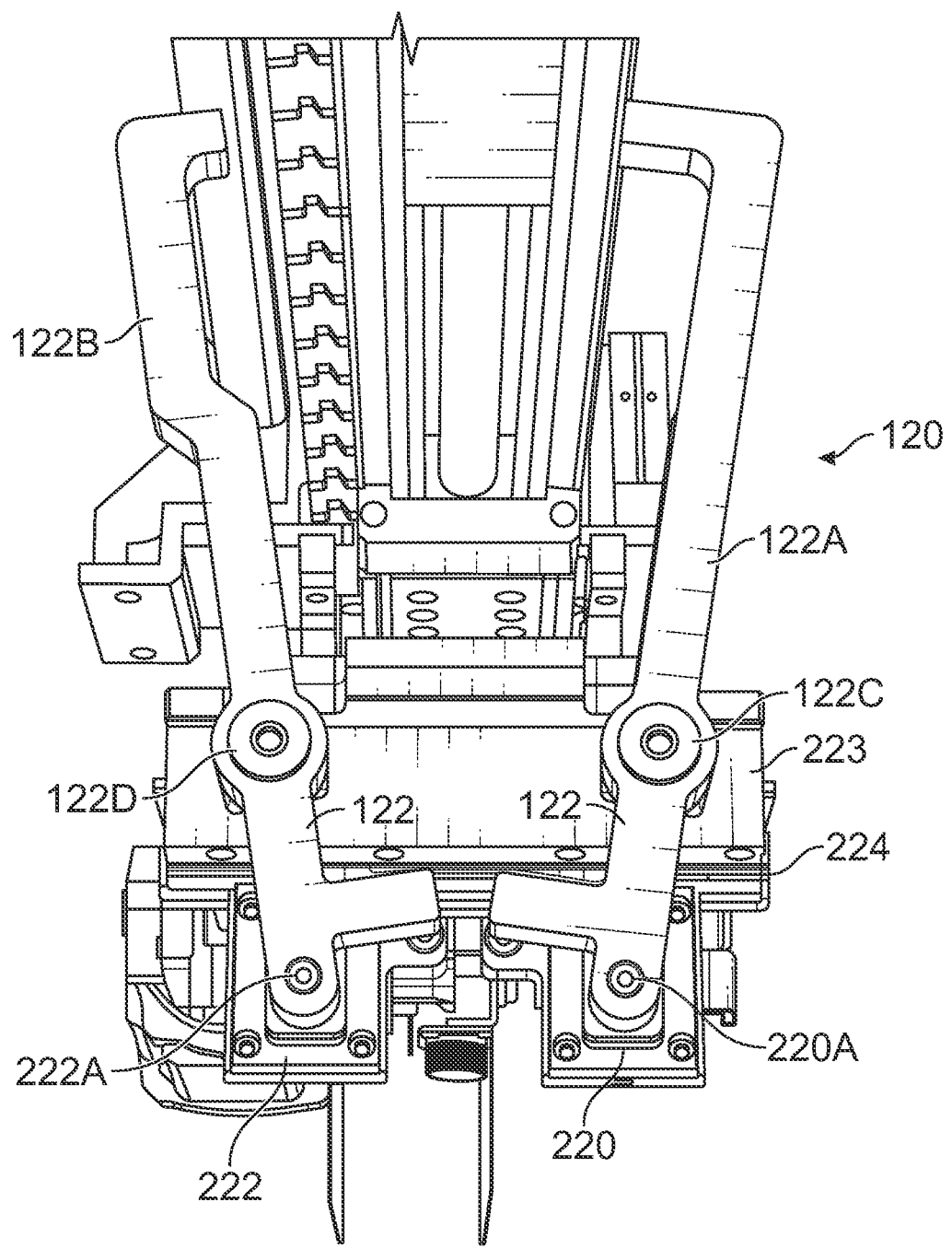
FIG. 8 is a side view of the first stop device.

The bypass carton accumulator 100 may further comprise first, second, third, fourth and fifth detector sensors 180A-180E, each of which may comprise a photodetector, see FIGS. 6 and 9. The first detector sensor 180A is positioned downstream of the first stop device 120, see FIG. 6, and senses cartons C moving along the carton conveyor 20 adjacent the location where the first detector sensor 180A is positioned. Signals from the first detector sensor 180A are used by the electronic controller 30 to determine if a steady flow of cartons is moving along the carton conveyor 20 at the location adjacent to where the first detector sensor 180A is positioned.

A supervisory electronic controller 300 may be coupled to the main electronic controller 30 and provide instructions to the electronic controller 30 regarding whether to (i) initiate a loading operation, i.e., add a slug of cartons SC to the storage apparatus 160, via the bypass carton accumulator 100, (ii) initiate an unloading operation, i.e., remove a slug of cartons SC from the storage apparatus 160, via the bypass carton accumulator 100, and place the slug of cartons SC on the carton conveyor 20; or (iii) not initiate either a loading or an unloading operation. The supervisory controller 300 may also be coupled to the cartoner, wrapper and/or case-packer (not shown) and may receive status information from those devices regarding output from each of those devices. The supervisory electronic controller 300 may send an instruction to the electronic controller 30 to initiate a loading operation when output from a downstream operation, e.g., at a wrapper or a casepacker, has slowed or stopped. The supervisory electronic controller 300 may send an instruction to the electronic controller 30 to initiate an unloading operation when output from an upstream operation, e.g., at a cartoner, has slowed or stopped. More specifically, the supervisory electronic controller 300 may determine that cartons C need to be discharged from the downstream region 20B of the conveyor belt 22 at a rate greater than the rate at which the upstream region 20A of the conveyor belt 22 is receiving cartons C, such that it initiates an unloading operation.

When the supervisory electronic controller 300 sends an instruction to the main electronic controller 30 to initiate a loading operation, the electronic controller 30 may determine, based on signals from the first detector sensor 180A, whether there is a steady flow of cartons C on the carton conveyor 20. If so, the electronic controller 30 may actuate the first electric drive motor 124 of the first stop device 120 to move the first and second stopper arms 122A and 122B to their second position such that the arms 122A and 122B are in the path of the cartons C to stop the flow of cartons C at the first downstream stop position SP, see FIG. 2. If cartons C are backed up on the carton conveyor 20 at the location of the first detector sensor 180A, i.e., the cartons C are stopped and not moving, the electronic controller 30 will not actuate the first electric drive motor 124 of the first stop device 120 to move the first and second stopper arms 122A and 122B to their second position such that the arms 122A and 122B are in the path of the cartons C to stop the flow of cartons C at the first downstream stop position SP, see FIG. 2, and will stop the loading operation. Once the signals from the first detector sensor 180A indicate that there is a steady flow of cartons C on the carton conveyor 20, the electronic controller 30 may actuate the first electric drive motor 124 of the first stop device 120 to move the first and second stopper arms 122A and 122B to their second position and then continue with the loading operation.

The second detector sensor 180B is positioned upstream of the first stop device 120, see FIG. 6, and senses cartons C moving along the carton conveyor 20 adjacent the location where the second detector sensor 180B is positioned. The second detector sensor 180B also senses gaps between the moving cartons C. The electronic controller 30 knows the location of the first stop device 120 via position signals from the articulation drive servo-motor 152 and the fixed location of the second detector sensor 180B. The electronic controller 30 only actuates the first electric drive motor 124 of the first stop device 120 to move the first and second stopper arms 122A and 122B to their second position such that the arms 122A and 122B are in the path of the cartons C moving along the carton conveyor 20 when there is a gap between adjacent cartons C at the location of the first and second arms 122A and 122B so as to not strike a carton moving on the carton conveyor 20 at the time of actuation of the first drive motor 124. The electronic controller 30 determines when there is a gap between adjacent cartons C at the location of the first stop device 120 based on signals from the second detector sensor 180B, position signals from the articulation servo-motor 152 and a known linear speed of the conveyor 22.

The third detector sensor 180C is positioned upstream of the clamping device 130 and the second stop device 140, see FIG. 9, and senses cartons C moving along the carton conveyor 20 adjacent the location where the third detector sensor 180C is positioned. Signals from the third detector sensor 180C are used by the electronic controller 30 to determine if a steady flow of cartons is moving along the carton conveyor 20 or whether cartons are backed up, i.e., stopped, at the location adjacent to where the third detector sensor 180C is positioned. If, after the first electric drive motor 124 of the first stop device 120 is actuated to move the first and second stopper arms 122A and 122B to their second position such that the arms 122A and 122B are in the path of the cartons C to stop the flow of cartons C at the first downstream stop position SP during a loading operation, cartons C are backed up on the carton conveyor 20 adjacent to the location of the third detector 180C, as sensed by the third detector sensor 180C, the electronic controller 30 may actuate the clamp drive motor 134 causing the first and second clamp members 132B and 132C to move toward the second carton conveyor rail 26B to clamp one or more cartons C between the clamp members 132B and 132C and the second carton conveyor rail 26B. If, on the other hand, after the first electric drive motor 124 of the first stop device 120 is actuated to move the first and second stopper arms 122A and 122B to their second position such that the arms 122A and 122B are in the path of the cartons C to stop the flow of cartons C at the first downstream stop position SP, cartons C are continuously moving past the third detector sensor 180C, the electronic controller 30 will know that a full slug of cartons SC has not yet been accumulated in the pick-up zone Z of the carton conveyor 20 and, hence, will not actuate the drive motor 134 of the clamping device 130.

Figure 15A:
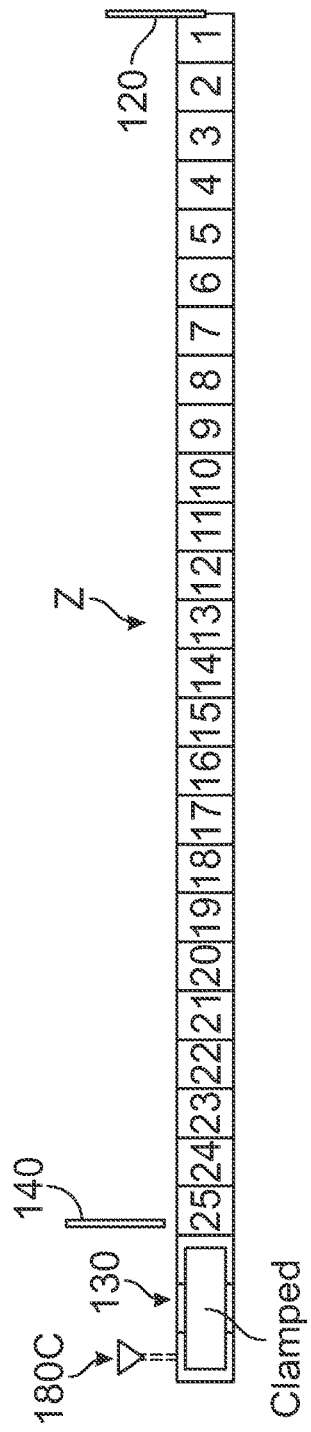
FIG. 15A-15C illustrate a process for moving the first stop device via the articulation device to create a gap between the clamping device and a last carton to enter a pick-up zone before actuation of the clamping device.

In FIG. 15A, a slug of cartons SC comprising twenty-five (25) cartons C is schematically illustrated located in the pick-up zone Z between the first stop device 120 and the clamping device 130. During a loading operation, after the first electric drive motor 124 of the first stop device 120 is actuated to move the first and second stopper arms 122A and 122B to their second position and the drive motor 134 of the clamping device 130 is actuated to effect clamping, the electronic controller 30 actuates the articulation drive servo-motor 152 to cause the linear actuator 154 to move the first stop device 120 in a direction away from the clamping device 130 and the second stop device 140 so as to create a gap G between the clamp members 132B and 132C and a last carton LC to enter the pick-up zone Z before actuation of the clamping device 130, e.g., carton 25 in the examples illustrated in FIGS. 15B and 15C. Preferably, the size of the gap G alternates between a first gap $G_1$, see FIG. 15B, and a second gap $G_2$, see FIG. 15C, wherein the second gap $G_2$ is larger in size than the first gap $G_1$. When the size of the gap G equals $G_1$, the slug of cartons SC positioned in the pickup zone Z is located in an upstream slug position. When the size of the gap G equals $G_2$, the slug of cartons SC positioned in the pickup zone Z is located in a downstream slug position. The last carton LC, e.g., carton 25, or trailing edge of the slug of cartons SC, is nearer to the second stop device 140 when the slug of cartons SC is in the upstream slug position than when the slug of cartons SC is in the downstream slug position.

Figure 15B:
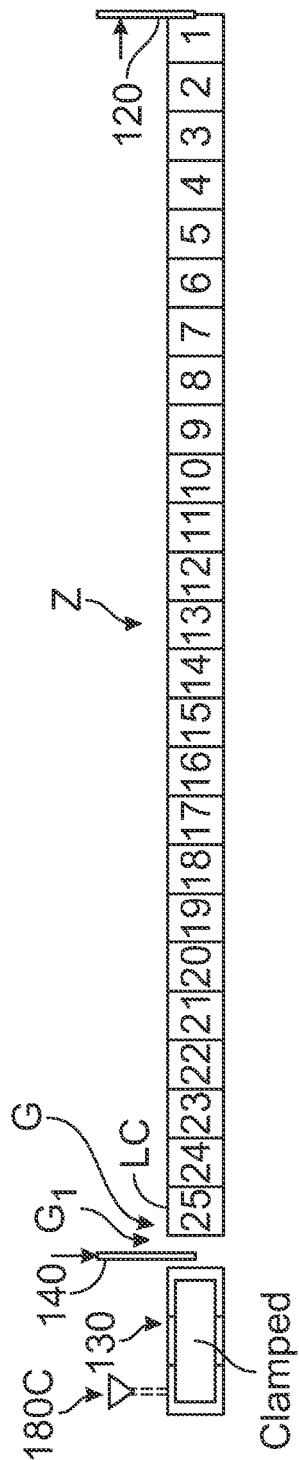
Figure 15C:
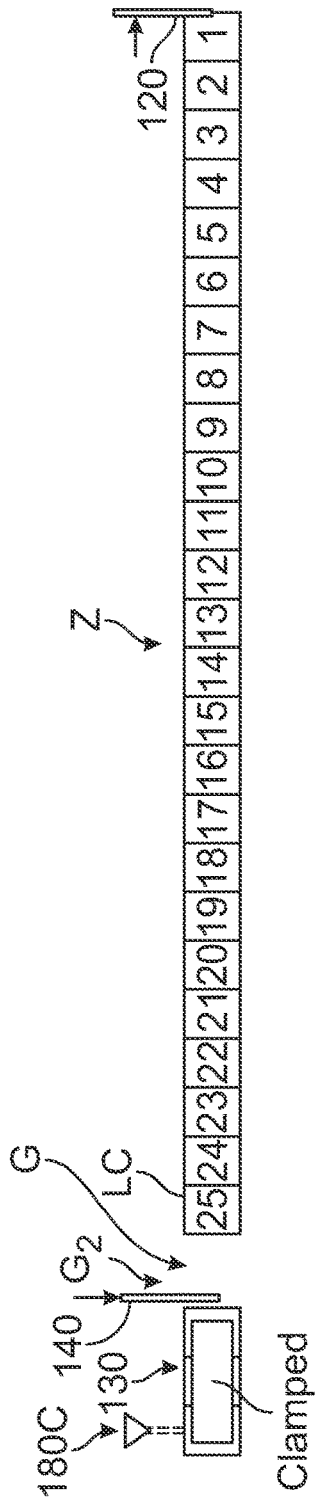

Once the gap G has been created between the clamp members 132B and 132C and a last carton LC to enter the pick-up zone Z before actuation of the clamping device 130, e.g., carton 25 in the examples illustrated in FIGS. 15B and 15C, the electronic controller 30 may actuate the drive motor 144 to cause the third and fourth stopper arms 142A and 142B of the second stopper 142, e.g., when the second stop device 140 comprises the second stopper 142, to pivot to their second position, so as to block any cartons that may slip out from between the clamp members 132B and 132C and the second carton conveyor rail 26B.

The fourth and fifth detector sensors 180D and 180E are positioned upstream of the first stop device 120 and downstream of the clamping device 130 and the second stop device 140, see FIG. 9, and sense cartons C on the carton conveyor 20 adjacent the locations where the fourth and fifth detector sensors 180D and 180E are positioned. During a loading operation, after the electronic controller 30 has actuated the articulation drive servo-motor 152 to cause the linear actuator 154 to move the first stop device 120 in a direction away from the clamping device 130 and the second stop device 140 so as to create a gap G between the clamp members 132B and 132C and a last carton LC to enter the pick-up zone Z before actuation of the clamping device 130, e.g., carton 25 in the examples illustrated in FIGS. 15B and 15C, the electronic controller 30 monitors signals from the fourth and fifth detector sensors 180D and 180E to determine if the slug of cartons SC is located in the upstream or the downstream slug position within the pick-up zone Z. When the slug of cartons SC is in the upstream slug position, see FIG. 15B, signals from both the fourth and fifth detectors 180D and 180E indicate that a carton(s) C is adjacent to the fourth and fifth detector sensors 180D and 180E. When the slug of cartons SC is in the downstream slug position, see FIG. 15C, signals from only the fourth detector 180D indicate that a carton is adjacent to the fourth sensor 180D, i.e., only the fourth detector 180D senses a carton C and the fifth detector 180E does not sense a carton. The electronic controller 30 may control the articulation drive servo-motor 152 to cause the linear actuator 154 to move the first stop device 120 away from the clamping device 130 so that sequential slugs of cartons C alternate between being positioned in the upstream slug position and the downstream slug position.

During a loading operation, after the electronic controller 30 has actuated the articulation drive servo-motor 152 to create a gap G between the clamp members 132B and 132C and a last carton LC to enter the pick-up zone Z, and the electronic controller 30 has determined, based on monitoring signals from the fourth and fifth detector sensors 180D and 180E, whether the slug of cartons SC is located in the upstream or the downstream slug position within the pick-up zone Z, the electronic controller 30 will cause the carton pick apparatus 110 to move to and pick up the slug of cartons SC from either the upstream or the downstream slug position in the pick-up zone Z and move the slug of cartons SC to the storage apparatus 160. More specifically, the electronic controller 30 controls the horizontal drive servo-motor 114A and the vertical drive servo-motor 116A so as to move the carton pick head 112 over the pick-up zone Z so the pick head 112 can engage the slug of cartons SC in the pick-up zone Z on the conveyor belt 22. Prior to, concurrently or just after the suction cups 112B make contact with the slug of cartons SC, as indicated by position signals generated by the servo-motors 114A and 116A, the electronic controller 30 actuates the first and second vacuum generators 112C and 112D causing a vacuum to be generated in the suction cups 112B causing the suction cups 112B to grasp the slug of cartons SC. Thereafter, the electronic controller 30 controls the horizontal drive servo-motor 114A and the vertical drive servo-motor 116A so as to move the carton pick head 112 from its position where it has grasped the slug of cartons SC in the pick-up zone Z to a predetermined position over the storage apparatus 160. If the slug of cartons SC was picked up from the upstream slug position of the pick-up zone Z, the electronic controller 30 may cause the horizontal and vertical servo-motors 114A and 116A to move the carton pick head 112 to place the slug of cartons SC in an upstream slug position of the storage apparatus 160. If the slug of cartons SC was picked up from the downstream slug position of the pick-up zone Z, the electronic controller 30 may cause the horizontal and vertical servo-motors 114A and 116A to move the carton pick head 112 to place the slug of cartons SC in a downstream slug position of the storage apparatus 160. When a slug of cartons SC is placed in the upstream slug position of the storage apparatus 160, the slug of cartons SC may engage or abut the first side containment plate 164A but does not engage the second side containment plate 164B. When the slug of cartons SC is placed in the downstream slug position of the storage apparatus 160, the slug of cartons SC may engage or abut the second side containment plate 164B but does not engage the first side containment plate 164B.

Figure 16:
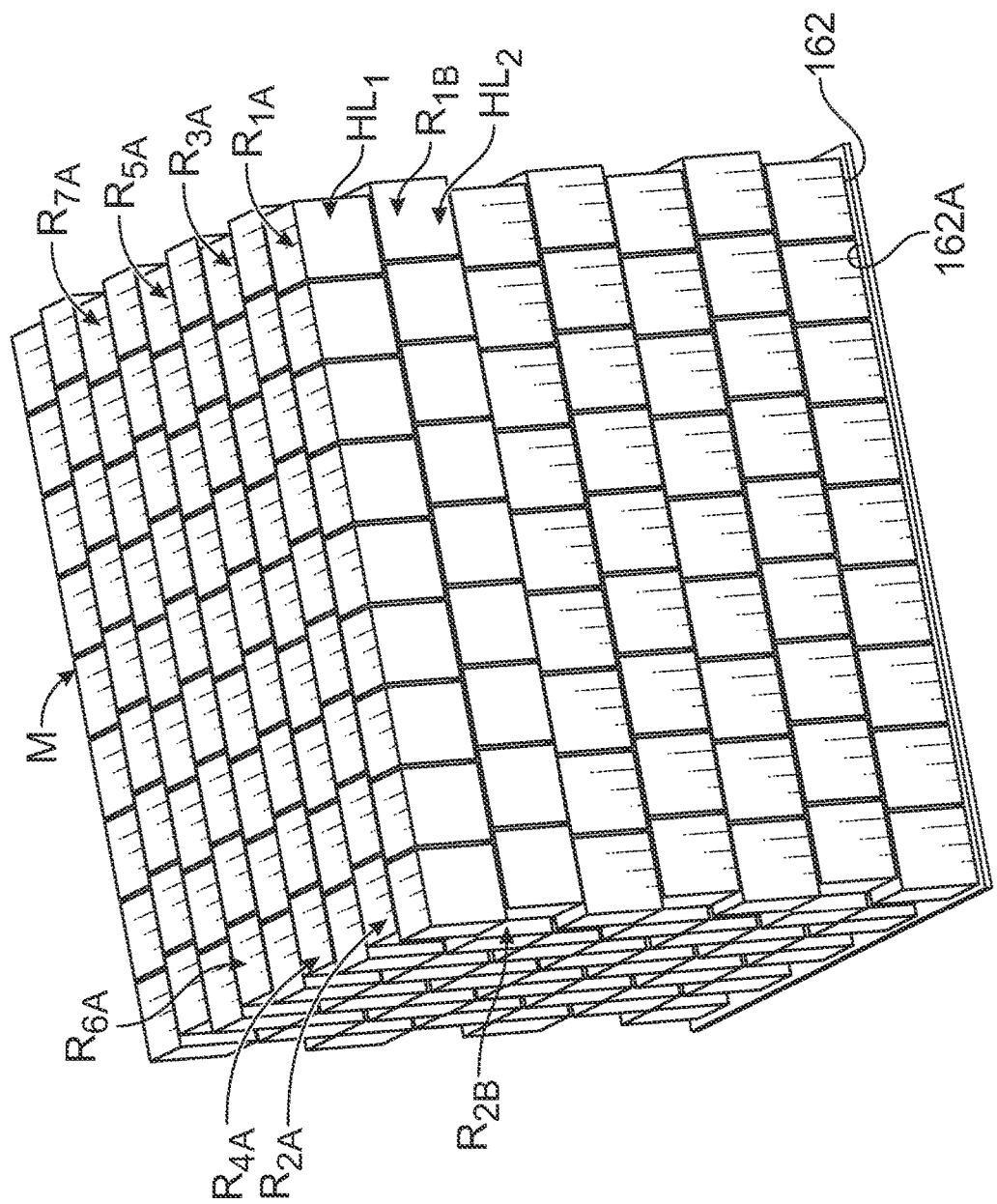
FIG. 16 illustrates a stack of cartons where adjacent slugs of cartons are alternatively positioned in upstream and downstream slug positions.

Hence, the electronic controller 30 causes the carton pick apparatus 110 to pick up one or more slugs of cartons SC from the pick-up zone Z. When two or more slugs of cartons are sequentially picked up from the pick-up zone Z, the electronic controller 30 causes the carton pick apparatus 110 to alternatively place the sequential slugs of cartons C in the upstream and downstream slug positions of the storage apparatus 160. In one implementation, the electronic controller 30 may control the carton pick apparatus 110 to place slugs of cartons in the storage apparatus containment box 167 to build horizontal layers of cartons, wherein alternative rows of cartons in each horizontal layer are alternatively placed in the upstream and the downstream slug position of the storage apparatus 160. The electronic controller 30 may further control the carton pick apparatus 110 to place slugs of cartons in the storage apparatus containment box 167 such that adjacent horizontal layers of cartons have vertically aligned rows of cartons that alternate between upstream and downstream slug positions. For example, as illustrated in FIG. 16, a first horizontal layer $HL_1$ of cartons of a stack or matrix of cartons on the base 162 is illustrated where rows $R_{1A}$, $R_{3A}$, $R_{5A}$, and $R_{7A}$ are located in an upstream slug position and rows $R_{2A}$, $R_{4A}$, and $R_{6A}$ are located in a downstream slug position. A second horizontal layer $HL_2$ of cartons is illustrated where row $R_{1B}$ is located in a downstream slug position, which differs from the row $R_{1A}$, positioned vertically directly above it, which is positioned in the upstream slug position. By alternating rows of cartons, both vertically and horizontally, between upstream and downstream positions, a brick-like matrix M is built on the base 162, which creates a more stable stack of cartons within the storage apparatus 160 while maintaining a high density of cartons therein.

The matrix M of cartons C on the base 162 in the example of FIG. 16 comprises: first and second layers of slugs of cartons $HL_1$ and $HL_2$, wherein the first layer $HL_1$ is positioned over and in contact with the second layer $HL_2$. The first layer $HL_1$ comprises first and second slugs of cartons SC positioned side-by-side in first and second rows $R_{1A}$ and $R_{2A}$. The second layer $HL_2$ comprises third and fourth slugs of cartons SC positioned side-by-side in adjacent rows $R_{1B}$ and $R_{2B}$. In the example illustrated in FIG. 16, no mechanical separators, e.g., plates or shelves, are positioned between the first and second slugs of cartons in the first layer $HL_1$, the third and fourth slugs of cartons in the second layer $HL_2$, or between the first and second layers of slugs of cartons $HL_1$ and layer $HL_2$. At least one carton of the first slug of products in the first row $R_{1A}$, is preferably in physical contact with at least one carton of the second slug of products in the second row $R_{2A}$.

As noted above, the containment device 267 may comprise a variable volume V defined by inner dimensions of the containment box 167, i.e., a length L and a width W, see FIGS. 1, 2 and 11, and a variable height H, which extends from an inner surface 162A of the base 162 to upper surfaces of the first side containment plate 164A, the second side containment plate 164B, the front containment plate 166A and the back containment plate 166B. The maximum volume V of the containment device 267 occurs when the movable base 162 is positioned in its lowermost position, i.e., most distant position from the upper surfaces of the containment plates 164A, 164B, 166A and 166B. Slugs of cartons SC may be placed in the containment device 267 such that at least 75%, preferably 80% and most preferably 85% of the volume V of the containment device 267 is filled with cartons C.

In an example, a carton C may have a generally cubed shape with dimensions of 4.25 inches; 4.5 inches; and 5 inches. A matrix of cartons may be formed within a containment device 267 such that it contains 10 vertically stacked layers of cartons C provided on a base 162 of the containment device 267, with each layer of cartons C comprising eleven rows of cartons C positioned side-by-side and each row of cartons comprising 25 cartons. The containment box 167 may have a length L=111.2 inches and a width W=53.3 inches and the height H between the upper surface of the base 162 to an upper surface of the containment box 167 may equal to 50 inches. The product volume within the containment device 267 comprises 262968.75 inches$^3$. The volume of the containment device 267 comprises 111.2×53.3×50=296348 inches$^3$. The amount of the containment device volume that is filled with cartons is 262968.75 inches$^3$/296348 inches$^3$=89%.

The electronic controller 30 may keep track of where in the storage apparatus 160 the most recent slug of cartons SC was placed by the carton pick apparatus 110, for example by storing, in the memory component 34, data corresponding to the placement location(s) of the most recently placed slug(s) of cartons SC. Because the electronic controller 30 will know where the most recently placed slug(s) of cartons SC has been placed in the storage apparatus 160, it can control the horizontal drive servo-motor 114A so as to move the carton pick head 112 to proceed to load the storage apparatus 160 with slugs of cartons SC in an organized manner such as to create the brick-like matrix.

Figure 17:
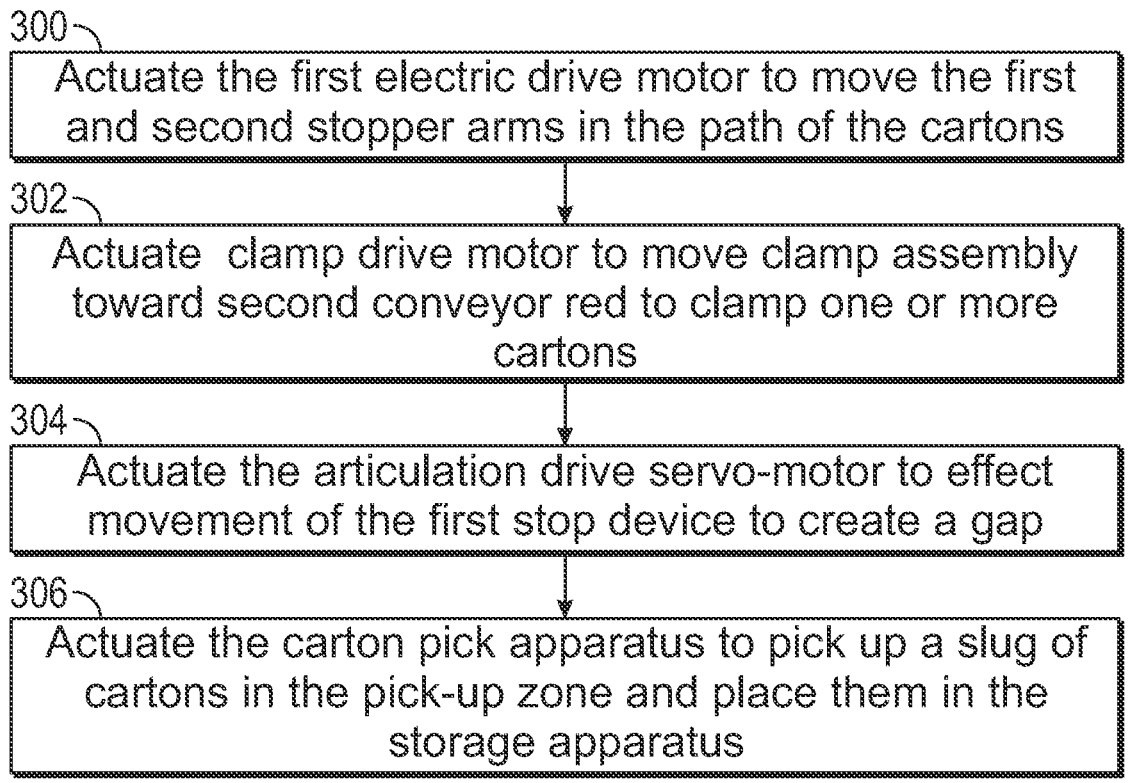
FIG. 17 illustrates steps performed by an electronic controller of the system to effect a carton transfer operation so as to move a slug of cartons from the carton conveyor to the storage apparatus.

To effect a carton transfer or loading operation during operation of the carton conveyor 20 so as to move a slug of cartons SC from the carton conveyor 20 to the storage apparatus 160, the processor 32 of the electronic controller 30, when executing executable instructions, may effect a method or process comprising the following steps, as set out in the flowchart of FIG. 17. In step 300, the processor 32 may actuate the first electric drive motor 124 of the first stop device 120 to move the first and second stopper arms 122A and 122B to their second position such that the arms 122A and 122B are in the path of the cartons C to stop or prevent the flow of cartons C at the first downstream stop position SP. In step 302, the processor 32 may actuate the clamp drive motor 134, after actuation of the first drive motor 124 of the first stop device 120, causing the clamp assembly 132 to move to its first position, where the first and second clamp members 132B and 132C move toward the second carton conveyor rail 26B to clamp one or more cartons C between the clamp members 132B and 132C and the second carton conveyor rail 26B. In step 304, the processor 32 may actuate the articulation drive servo-motor 152, after actuation of the clamp drive motor 134, to effect movement of the first stop device 120, and hence, the first stopper 122, in a direction away from the clamping device 130 so as to create a gap between the clamping device 130 and a last carton C to enter the pick-up zone Z before actuation of the clamping device 130. In step 306, the processor 32 may actuate the carton pick apparatus 110 to cause the carton pick head 112 to pick up an accumulated set of cartons, i.e., a slug of cartons, from the pick-up zone Z and place the accumulated set of cartons in the storage apparatus 160.

Figure 18:
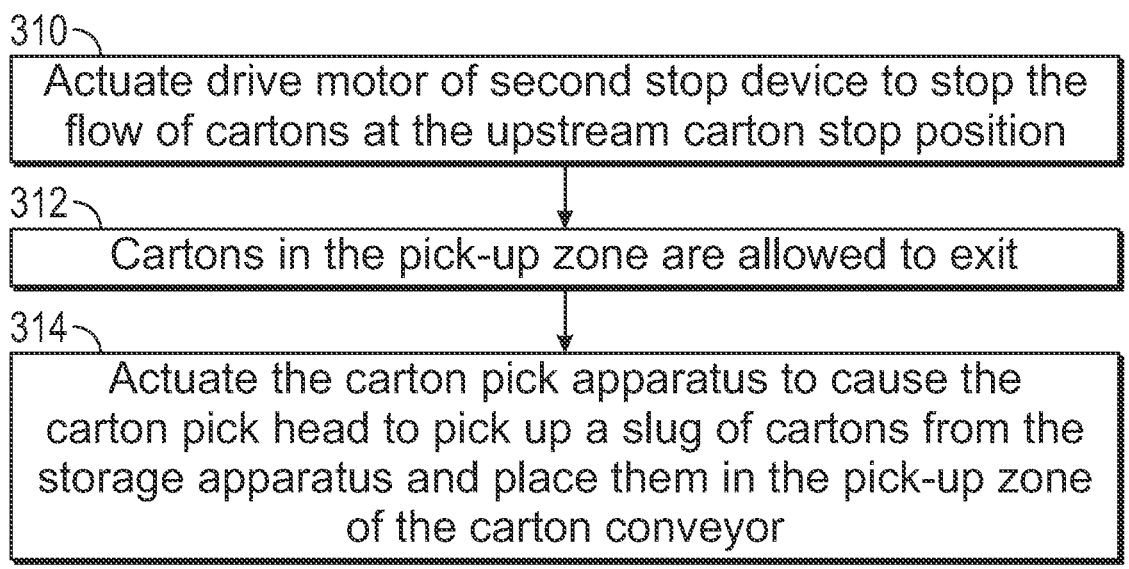
FIG. 18 illustrates steps performed by the electronic controller of the system to effect a carton transfer operation so as to move a slug of cartons from the storage apparatus to the carton conveyor.

In order to effect an unloading operation in response to receiving an unloading command from the supervisory electronic controller 300, i.e., remove a slug of cartons SC from the storage apparatus 160 and place the slug of cartons SC on the conveyor belt 22, the processor 32 of the electronic controller 30, when executing the executable instructions, may effect a method or process comprising the following steps, as set out in the flowchart of FIG. 18. In step 310, the processor 32 actuates the drive motor 144 of the second stop device 140 to cause the third and fourth stopper arms 142A and 142B to pivot from their first position, see FIG. 19A, to their second position, see FIG. 19B, where the arms 142A and 142B are positioned in the path of the flow of the cartons C to stop the flow of the cartons C along the carton conveyor 20 near the upstream carton stop position in the pick-up zone Z.

As noted above, the third detector sensor 180C is positioned upstream of the clamping device 130 and the second stop device 140, see FIG. 9, and senses cartons C moving along the carton conveyor 20 adjacent the location where the third detector sensor 180C is positioned. The third detector sensor 180C also senses gaps between the moving cartons C. The electronic controller 30 knows the fixed location of the second stop device 140 and the fixed location of the third detector sensor 180C. The electronic controller 30 only actuates the second electric drive motor 144 of the second stop device 140 to move the third and fourth stopper arms 142A and 142B to their second position such that the arms 142A and 142B are in the path of the cartons C moving along the carton conveyor 20 when there is a gap between adjacent cartons C at the location of the third and fourth arms 142A and 142B so as to not strike a carton moving on the carton conveyor 20 at the time of actuation of the second drive motor 144. The electronic controller 30 determines when there is gap between adjacent cartons C at the location of the second stop device 140 based on signals from the third detector sensor 180C and a known linear speed at which the conveyor belt 22 is moving.

In step 312, any cartons in the pick-up zone are allowed to exit along the carton conveyor 120, see FIG. 19C. The processor 32 may actuate the clamping device 130 after actuating the second drive motor 144 to assist in preventing the flow of cartons along the carton conveyor 20.

In step 314, the processor 32 actuates the carton pick apparatus 110 to cause the carton pick head 112 to pick up an accumulated set of cartons, i.e., a slug of cartons, from the storage apparatus 160 and place the accumulated set of cartons in the pick-up zone Z of the carton conveyor 120.

More specifically, the electronic controller 30 may control the horizontal drive servo-motor 114A and the vertical drive servo-motor 116A so as to move the carton pick head 112 to either the upstream or the downstream slug position within the storage apparatus 160 so the pick head 112 engages the slug of cartons SC in the storage apparatus 160. Prior to, concurrently or just after the suction cups 112B make contact with the slug of cartons SC, as indicated by position signals generated by the servo-motors 114A and 116A, the electronic controller 30 actuates the first and second vacuum generators 112C and 112D causing a vacuum to be generated in the suction cups 112B causing the suction cups 112B to grasp the slug of cartons SC. Thereafter, the electronic controller 30 controls the horizontal drive servo-motor 114A and the vertical drive servo-motor 116A so as to move the carton pick head 112 from its position where it has grasped the slug of cartons SC in the storage apparatus 160 to a position over carton conveyor 120 and then to a position so that the slug of cartons is placed on the carton conveyor 120.

The electronic controller 30 may also assigned each slug of cartons SC placed in the storage apparatus 160 with a timestamp as to when the slug of cartons was placed in the storage apparatus 160. The controller 30 may provide the timestamp information to the supervisory controller 300. The supervisory controller 300 may instruct the main controller 30 to remove one or more slugs of cartons from the storage apparatus 160 after the one or more slugs of cartons have been stored for longer than a predefined desired time period.

As noted above, the term "processor" or "controller" is also intended to encompass a combination of two or more of the above recited devices, e.g., two or more microcontrollers. For example, the electronic controller 30 may be defined by first and second electronic controllers that are coupled together and communicate with one another. The first electronic controller may control the conveyor drive motor 24. The second electronic controller may be coupled to the first, second, third, fourth and fifth detector sensors 180A-180E and coupled to and control the first electric drive motor 124, the clamp electric drive motor 134, the second electric drive motor 144, the first and second vacuum generators 112C and 112D, the articulation drive motor 152, the horizontal and vertical drive motors 114A and 116A and the first and second lift motors 172A and 172B.

While in the illustrated embodiment, the carton pick head picks up a full-length slug of cartons, it is contemplated that the carton pick head may pick up less than a full-length slug of cartons. In such an embodiment, the pick head could be sized smaller than the length of a slug of cartons.

While in the illustrated embodiment, the bypass product accumulator comprises a first stop device 120 and a clamping device 130 to isolate a slug of cartons for transfer, it is contemplated that a diverter may be provided instead, which diverter may be associated with the conveyor belt 22 to divert a plurality of cartons defining a slug of cartons from the conveyor belt 22 to an adjacent conveyor belt. The pick head 112 would then pick the slug of cartons from the adjacent conveyor belt and move the slug of cartons to the storage apparatus. Instead of a diverter, a flighted conveyor could be employed.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system comprising a product conveyor and a bypass product accumulator adjacent to, and interfaced with, the product conveyor;
   wherein the bypass product accumulator comprises:
      a product transfer apparatus;
      at least one stop device comprising a stopper movable between a first and a second position, when in the first position the stopper does not interfere with the flow of products along the conveyor and when in the second position, the stopper engages with a product to stop a flow of products along the conveyor; and
      a storage apparatus;
   wherein the product transfer apparatus is configured to pick up a set of products from a pick-up zone of the product conveyor after the stopper has moved to its second position and place the set of products in the storage apparatus;
   wherein the product conveyor comprises a product flow direction and wherein the at least one stop device comprises a first stop device comprising a first stopper, the first stop device positioned in a downstream region of the product conveyor and configured such that actuation of the first stop device causes the first stopper to move into a path of the flow of products to stop the flow of products at a first downstream product stop position thereby causing a contiguous backlog of products in the pick-up zone;

wherein the bypass product accumulator further comprises a clamping device comprising at least one clamping element, the clamping device positioned upstream from the first stop device and configured such that actuation of the clamping device causes the at least one clamping element to stop the flow of products at an upstream product stop position thereby preventing the flow of products into the pick-up zone; and an articulation device coupled to the first stop device and configured to effect movement of the first stopper in a direction away from the clamping device so as to create a gap between the clamping device and a last product to enter the pick-up zone before actuation of the clamping device, thereby adjusting a location of the set of products in the pick-up zone between at least an upstream slug position of the pick-up zone and a downstream slug position of the pick-up zone, wherein the set of products defines a slug of products and a trailing edge of the slug of products is nearer to the clamping device when the slug of products is in the upstream slug position than when the set of products is in the downstream slug position.

2. The system of claim 1, wherein the bypass product accumulator further comprises a second stop device comprising a second stopper, the second stop device positioned adjacent to and downstream from the clamping device and upstream of the first stop device, the second stop device is configured such that actuation of the second stop device causes the second stopper to move adjacent to or engage a product clamped by the clamping device.

3. The system of claim 2, wherein the system further comprises a processor and memory for storing code executable by the processor, the processor when executing the executable code:
(i) actuates the second stop device to cause the second stopper to prevent the flow of products from near the upstream product stop position into the pick-up zone,
(ii) allows any products in the pick-up zone to exit along the product conveyor, and
(iii) actuates the product transfer apparatus to pick up an accumulated set of products from the storage apparatus and place the accumulated set of products in the pick-up zone of the product conveyor.

4. The system of claim 1, wherein the storage apparatus comprises:
a base;
a first side containment plate positioned at an upstream end of the storage apparatus and a second side containment plate positioned at a downstream end of the storage apparatus; and
a front containment plate positioned at an end of the storage apparatus most proximate to the product conveyor and a back containment plate positioned at an end of the storage apparatus opposite the front containment plate; and
wherein the product transfer apparatus is further configured to place a set of products picked up from the upstream slug position of the pick-up zone in an upstream slug position of the storage apparatus and to place a set of products picked up from the downstream slug position of the pick-up zone in a downstream slug position of the storage apparatus;
wherein a set of products placed in the upstream slug position of the storage apparatus abuts the first side containment plate; and
wherein a set of products placed in the downstream slug position of the storage apparatus abuts the second side containment plate.

5. The system of claim 4, wherein the product transfer apparatus is further configured to:
(i) sequentially pick up a multiplicity of slugs of products from the pick-up zone, and
(ii) sequentially place each slug of products from the multiplicity into the storage apparatus, wherein the slugs of products alternate between the upstream and downstream slug positions of the storage apparatus.

6. The system of claim 4, wherein the storage apparatus further comprises a lift apparatus coupled to the base which allows the height of the base and any products thereon to be adjusted.

7. The system of claim 1, wherein the system further comprises a processor and memory for storing code executable by the processor, the processor when executing the executable code:
(i) actuates the first stop device to, via the first stopper, prevent the flow of products at the first downstream stop position,
(ii) actuates the clamping device after actuation of the first stop device to, via the at least one clamping element, stop the flow of products at the upstream product stop position,
(iii) actuates the articulation device after actuation of the clamping device to move the first stopper in a direction away from the clamping device to create the gap between the clamping device and the last product to enter the pick-up zone before actuation of the clamping device, and
(iv) actuates the product transfer apparatus to pick up an accumulated set of products from the pick-up zone and place the accumulated set of products in the storage apparatus.

8. The system of claim 1, wherein the product transfer apparatus may comprise a product pick head comprising one or more vacuum suction cups.

9. A method for moving products from a product conveyor to a storage apparatus using a bypass product accumulator positioned adjacent to, and interfaced with, the product conveyor;
wherein the bypass product accumulator comprises:
a product transfer apparatus;
a first stop device comprising a first stopper, the first stop device positioned in a downstream region of the product conveyor; and
a clamping device comprising at least one clamping element, the clamping device positioned upstream from the first stop device;
the method comprising:
actuating the first stop device to, via the first stopper, prevent the flow of products at a first downstream stop position;
actuating the clamping device after actuation of the first stop device to, via the at least one clamping element, stop the flow of products at an upstream product stop position; and
actuating the product transfer apparatus to pick up an accumulated set of products from a pick-up zone of the product conveyor and place the accumulated set of products in the storage apparatus.

10. The method of claim 9, wherein the bypass product accumulator further comprises an articulation device coupled to the first stopper, the method further comprising:
actuating the articulation device after actuation of the clamping device to effect movement of the first stopper to create a gap between the clamping device and a last product to enter the pick-up zone of the conveyor before actuation of the clamping device.

11. The method of claim 10, wherein the articulation device effects movement of the first stop device to create a first gap between the clamping device and a last product to enter the pick-up zone of the conveyor before actuation of the clamping device for a first set of products and effects movement of the first stop device to create a second gap between the clamping device and a last product to enter the pick-up zone of the conveyor before actuation of the clamping device for a second set of products, wherein the first gap is different from the second gap.

12. The method of claim 9, wherein the product transfer apparatus places the accumulated set of products in an upstream slug position in the storage apparatus, further comprising after placing the accumulated set of products in the upstream slug position:
actuating the first stop device to, via the first stopper, prevent the flow of products at the first downstream stop position;
actuating the clamping device after actuation of the first stop device to, via the at least one clamping element, stop the flow of products at the upstream product stop position; and
actuating the product transfer apparatus to pick up a next accumulated set of products from the pick-up zone of the product conveyor and place the next accumulated set of products in a downstream slug position of the storage apparatus.

13. A method for moving products between a product conveyor and a storage apparatus using a product transfer apparatus, the method comprising:
actuating the product transfer apparatus to sequentially pick up a plurality of slugs of products from the product conveyor and transfer each of the plurality of slugs of products picked from the product conveyor to the storage apparatus so as to build a matrix of products in the storage apparatus, the matrix of products comprising:
first and second layers of slugs of products, the first layer being positioned over and in contact with the second layer, the first layer comprising first and second slugs of products positioned side-by-side and adjacent to one another and the second layer comprising third and fourth slugs of products positioned side-by-side and adjacent to one another.

14. The method of claim 13, wherein no mechanical separators are positioned between the first and second slugs of products positioned side-by-side, the third and fourth slugs of products positioned side-by-side or the first and second layers of slugs of products.

15. The method of claim 13, wherein at least one product of the first slug of products and at least one product of the second slug of products are in physical contact with one another.

16. The method of claim 13, wherein the storage apparatus comprises a containment device defined by a containment box having inner dimensions and a base having an inner surface, wherein the containment device defines a volume for receiving slugs of products defined by the inner dimensions of the containment box and extending from the inner surface of the base to an upper surface of the containment box, wherein slugs of product are capable of filling at least 75% of the volume.

17. The method of claim 13, further comprising actuating the product transfer apparatus to pick up a slug of products from the storage apparatus and place the slug of products on the product conveyor.

\* \* \* \* \*